COINCIDENT CURRENT DESTRUCTIVE READOUT MAGNETIC MEMORY SYSTEM

Filed Feb. 14, 1966 10 Sheets-Sheet 1

INVENTORS.
RONALD W. HATTON
RUSSELL R. ROMBERGER

BY Samuel Kane
ATTORNEY

COINCIDENT CURRENT DESTRUCTIVE READOUT MAGNETIC MEMORY SYSTEM

Filed Feb. 14, 1966

INVENTORS.
RONALD W. HATTON
RUSSELL R. ROMBERGER
BY
Samuel Kane
ATTORNEY

COINCIDENT CURRENT DESTRUCTIVE READOUT MAGNETIC MEMORY SYSTEM

Filed Feb. 14, 1966 10 Sheets-Sheet 4

INVENTORS.
RONALD W. HATTON
RUSSELL R. ROMBERGER
BY Samuel Kane
ATTORNEY

COINCIDENT CURRENT DESTRUCTIVE READOUT MAGNETIC MEMORY SYSTEM

INVENTORS.
RONALD W. HATTON
RUSSELL R. ROMBERGER
BY Samuel Kane
ATTORNEY

INVENTORS.
RONALD W. HATTON
RUSSELL R. ROMBERGER

BY Samuel Kane
ATTORNEY

INVENTORS.
RONALD W. HATTON
RUSSELL R. ROMBERGER
BY Samuel Kane
ATTORNEY

INVENTORS.
RONALD W. HATTON
RUSSELL R. ROMBERGER
BY Samuel Kane
ATTORNEY

INVENTORS.
RONALD W. HATTON
RUSSELL R. ROMBERGER
BY Samuel Kane
ATTORNEY

United States Patent Office 3,487,383
Patented Dec. 30, 1969

3,487,383

COINCIDENT CURRENT DESTRUCTIVE READ-OUT MAGNETIC MEMORY SYSTEM

Ronald W. Hatton, Philadelphia, and Russell R. Romberger, Melvern, Pa., assignors to Burroughs Corporation, Detroit, Mich., a corporation of Michigan Filed Feb. 14, 1966, Ser. No. 527,360
Int. Cl. G11b 5/00
U.S. Cl. 340—174 16 Claims

ABSTRACT OF THE DISCLOSURE

A coincident current, destructive read-out magnetic memory system is disclosed which can be operated in either the read-restore or clear-write modes and over a wide temperature range. An address selection network is disclosed as well as circuits for reducing power drain in the system and for more accurate regulation and control of currents. Capacitive coupling between drive lines and inhibit lines and between inhibit lines and sense lines is significantly reduced. In the event of a timing failure, certain control devices are automatically turned off. Sense amplifiers are constructed for reducing the effect of sense line to drive line capacitance and for providing multiple outputs in response to signals of either polarity.

This invention relates generally to information storage devices and more particularly to magnetic memory systems for use in computers. While not limited thereto, the invention was designed particularly for use in a computer system disclosed and claimed in a copending application of Hans B. Marx, entitled "Modular Computer System" filed February 1966 and assigned to the same assignee as the present invention.

An object of the invention is to provide an improved magnetic memory system.

Another object of the invention is to provide improvements in the address selection networks of magnetic memory systems.

A further object of the invention is to provide improvements in the current driving circuits for magnetic memory systems.

Another object of the invention is to provide improvements in the circuits for driving inhibit current in such memory systems.

Another object of the invention is to provide improvements in the sense amplifiers of magnetic memory systems.

A more specific object of the invention is to provide a destructive read-out type of memory system which can be operated both in the read-restore and clear-write modes.

A further object of the invention is to provide a memory system in which power drain is significantly reduced.

Another object of the invention is to provide such a system in which the drive currents may be more accurately regulated.

A further object of the invention is to provide a memory system which may be operated more efficiently over a wide temperature range.

More specifically, it is another object of the invention to compensate the drive currents in such memory systems for changes in temperature occurring in the memory stack containing the magnetic storage elements.

Another more specific object of the invention is to compensate the inhibit current in such systems for changes in temperature, preferably on a bit basis, rather than on a memory stack basis.

Still another more specific object of the invention is to provide improvements in such memory systems whereby the temperature-current relationship of the inhibit current is corrected over a predetermined temperature range, and without the need of a variable voltage supply for such purpose.

Another more specific object of the invention is to provide an improved memory system in which current regulation is not affected by the regulation of the power supply.

Another object of the invention is to provide an improved memory system whereby the effect of capacitive coupling between the drive lines and the inhibit lines, and between the inhibit lines and the sense lines is significantly reduced.

A further object of the invention is to provide such a memory system with improved safety features whereby certain of the control devices are automatically turned off in the event of a timing failure.

In accordance with the above objects and considered first in one of its broader aspects, the invention comprises a bistable state magnetic storage element and two drive lines each inductively coupled to the storage element for individually receiving switching currents, both of which are necessary to switch the storage element from one state to the other. Current generating driving circuits are provided, each for driving current through one of the drive lines and these are actuated by means including a source of timing signals into a state in which they are substantially saturated. Stabilizing means, which are actuated by certain of the timing signals, after the driving circuits are substantially saturated, cooperate with the driving circuits for generating and stabilizing the drive currents so that they flow from the substantially saturated driving circuits and through the drive lines and the stabilizing means.

In another of its broader aspects, the invention provides an address selection matrix which comprises a plurality of column conductors, a plurality of row conductors, and a plurality of selection units each coupled to one of the column conductors and to one of the row conductors. Each selection unit comprises a drive line connected at one end to the associated column conductor, a first asymmetrical current conducting device connected between the other end of the drive line and the associated row conductor, a second asymmetrical current conducting device connected to said one end of the drive line and in series with the first asymmetrical current conducting device and the drive line, and switching means coupled to the second asymmetrical current conducting device and to the associated row conductor for forward-biasing the asymmetrical current conducting devices to enable current flow in one direction through the drive line.

In another of its broader aspects, the invention comprises a drive line and first and second current generating driving circuits. Each of the driving circuits comprises an electronic control device having an emitter electrode, a collector electrode and a control electrode. The emitter electrode of the first control device is coupled to one end of the drive line and the collector electrode of the second control device is coupled to the other end of the drive line. Means is provided for substantially saturating the control devices, and further means is provided which cooperates with the substantially saturated control devices for subsequently driving current through the drive line.

In another of its broader aspects, the invention provides a driving circuit for driving current through a conductor which is inductively coupled to one of the magnetic storage elements. The driving circuit comprises an electronic control device having an emitter electrode, a collector electrode and a control electrode, and means for coupling one of the emitter and collector electrodes to the conductor. A transformer is provided whose secondary circuit includes the control electrode and one of the other electrodes, and further means is provided for energizing the primary winding of the transformer.

In another of its broader aspects, the invention provides a current compensating network which comprises a constant current generator having an output terminal coupled to one end of a drive line which is inductively coupled to a plurality of magnetic storage elements and regulating means responsive to the temperature changes in the vicinity of the storage elements for providing output signals of different values each corresponding to a particular temperature. Signal applying means is connected to receive the output signals for applying corresponding input signals of different values to an input terminal of the current generator.

In another of its broader aspects, the invention provides an amplifying means for amplifying signals of either polarity which are induced into a sense line whenever certain ones of a plurality of magnetic storage elements are switched from one state to another. This amplifying means comprises first and second electronic control devices, each having an emitter electrode, a collector electrode and a control electrode. The emitter electrodes are interconnected and a constant current generator is provided which is connected between the junction of the emitter electrodes and a source of potential. Means is provided for converting an induced sense line signal into positive and negative signals with respect to a point of reference potential and for applying these positive and negative signals individually to the control electrodes. Additional means is provided for coupling the collector electrodes to output terminal means of the amplifying means.

The invention will be more clearly understood when the following description of the preferred embodiment thereof is read in conjunction with the accompanying drawings in which FIG. 1 is a block diagram of a memory system according to the invention;

Figure 3:
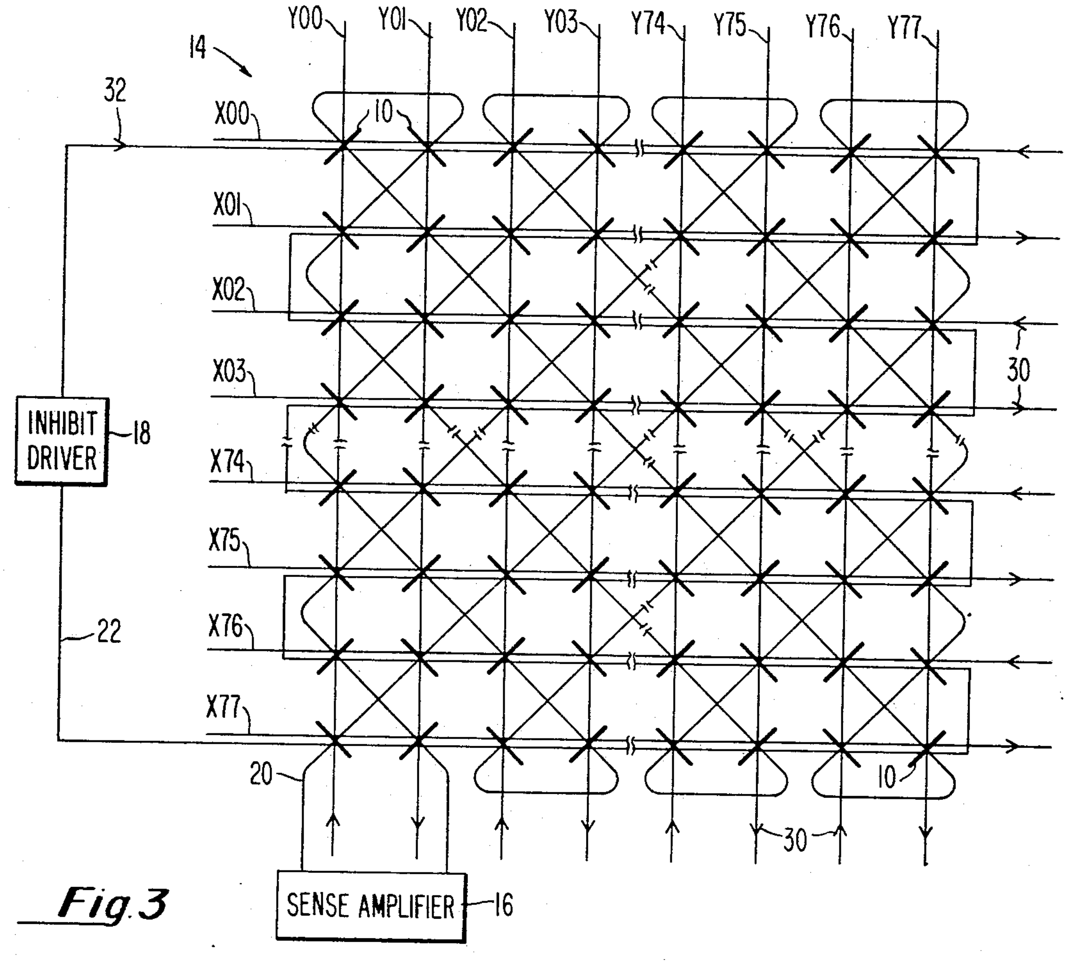
FIG. 3 is a diagrammatic broken view of a matrix of magnetic storage elements which constitutes one bit plane of the memory.
Figures 6, 6A:
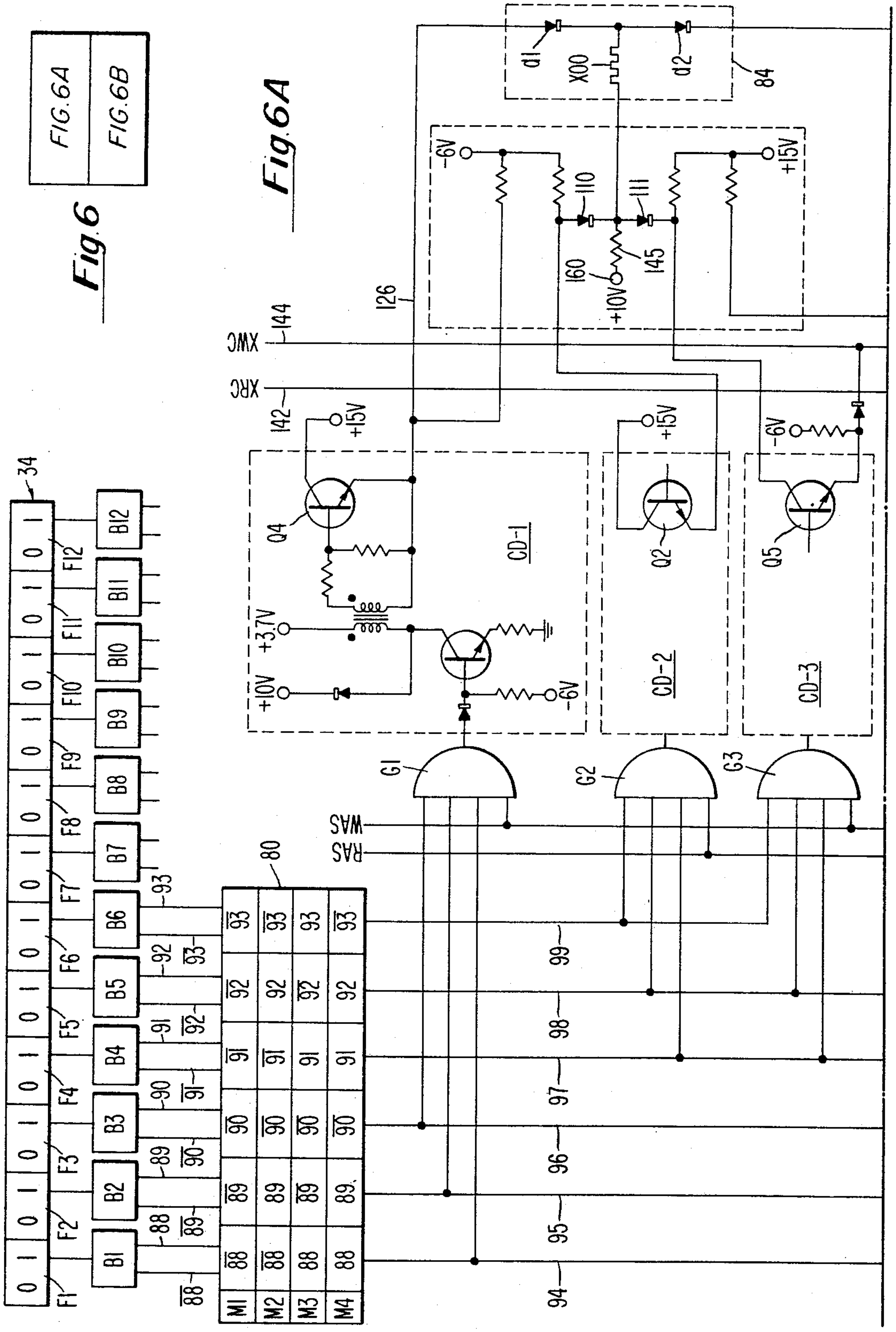
Figure 6B:
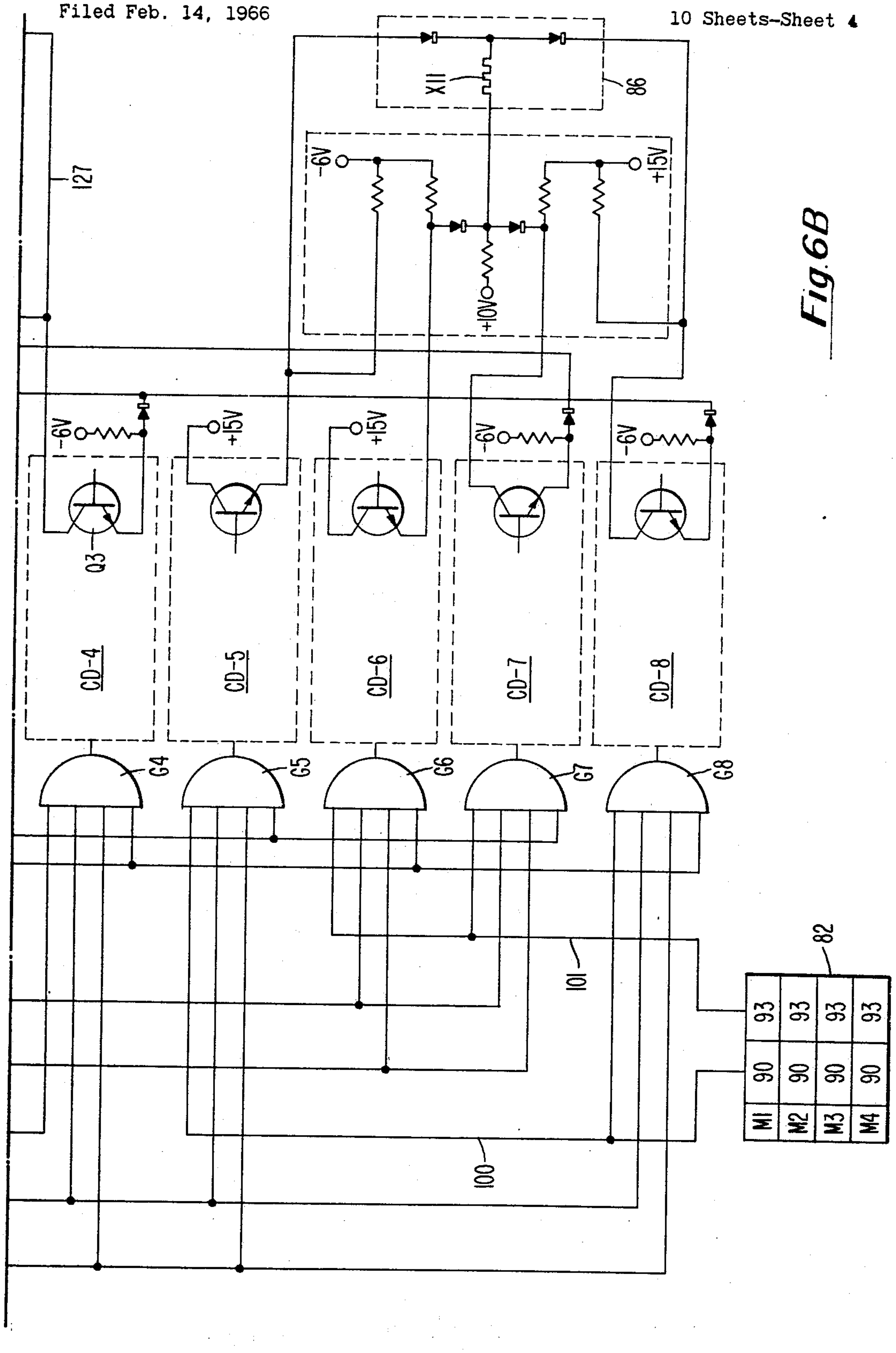
Figure 7:
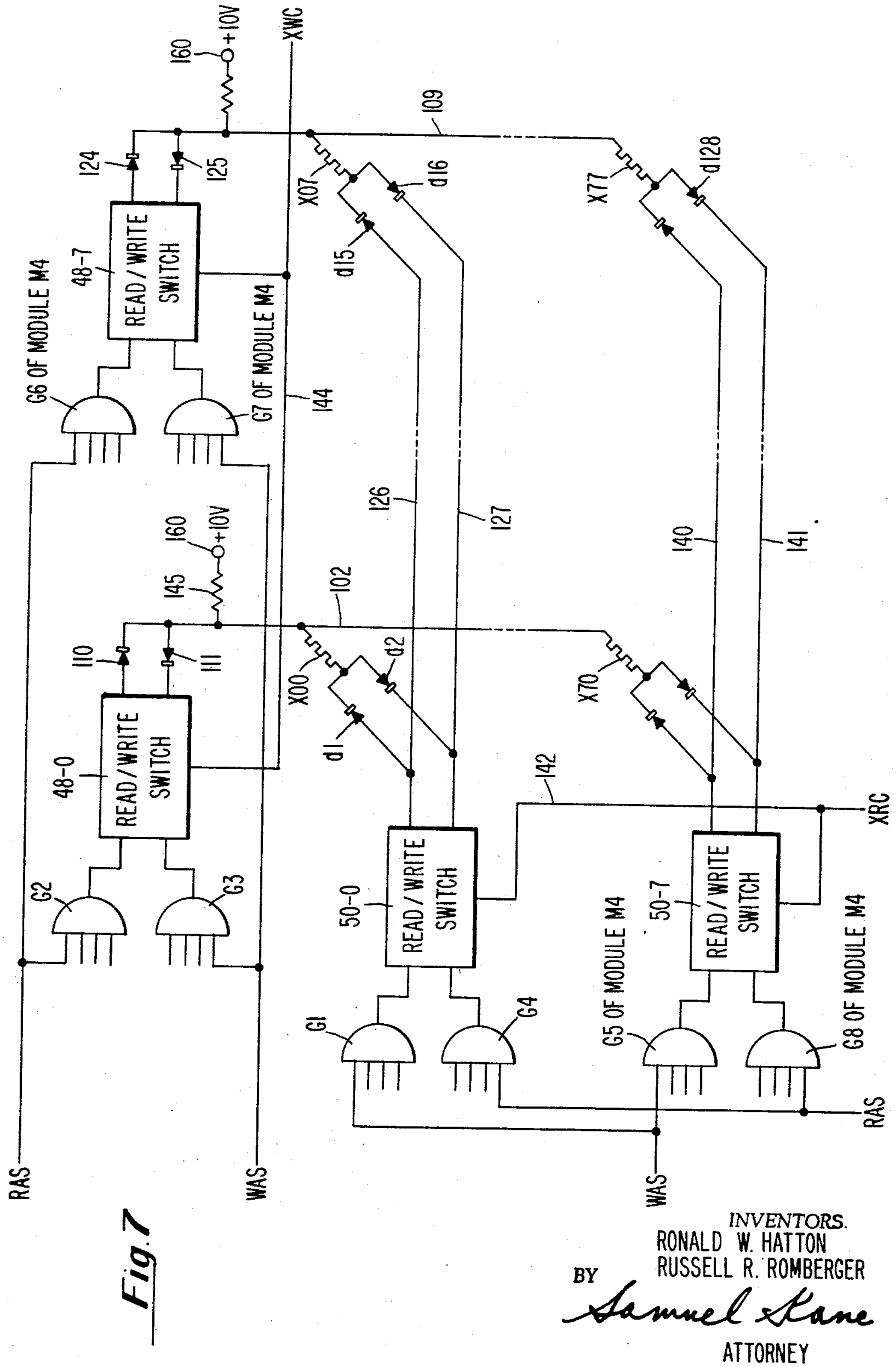
Figure 8:
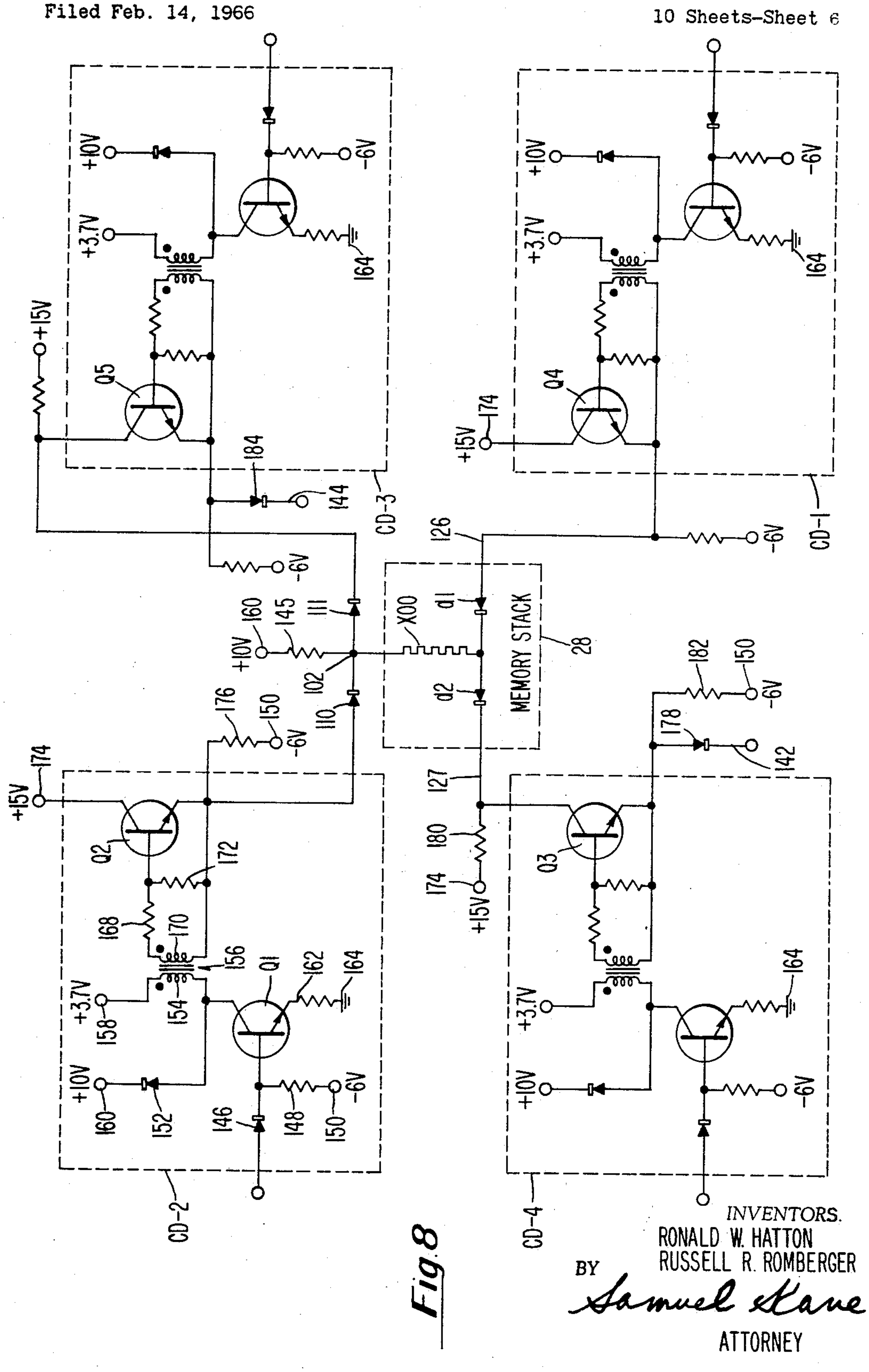
Figure 9:
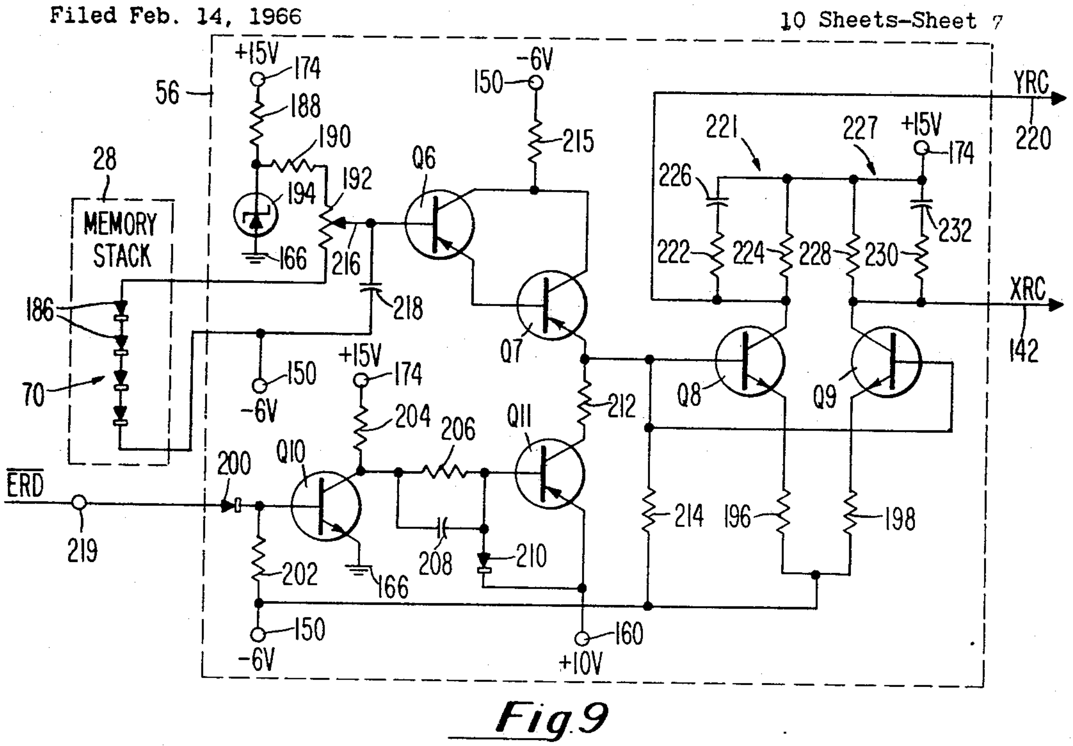
Figure 10:
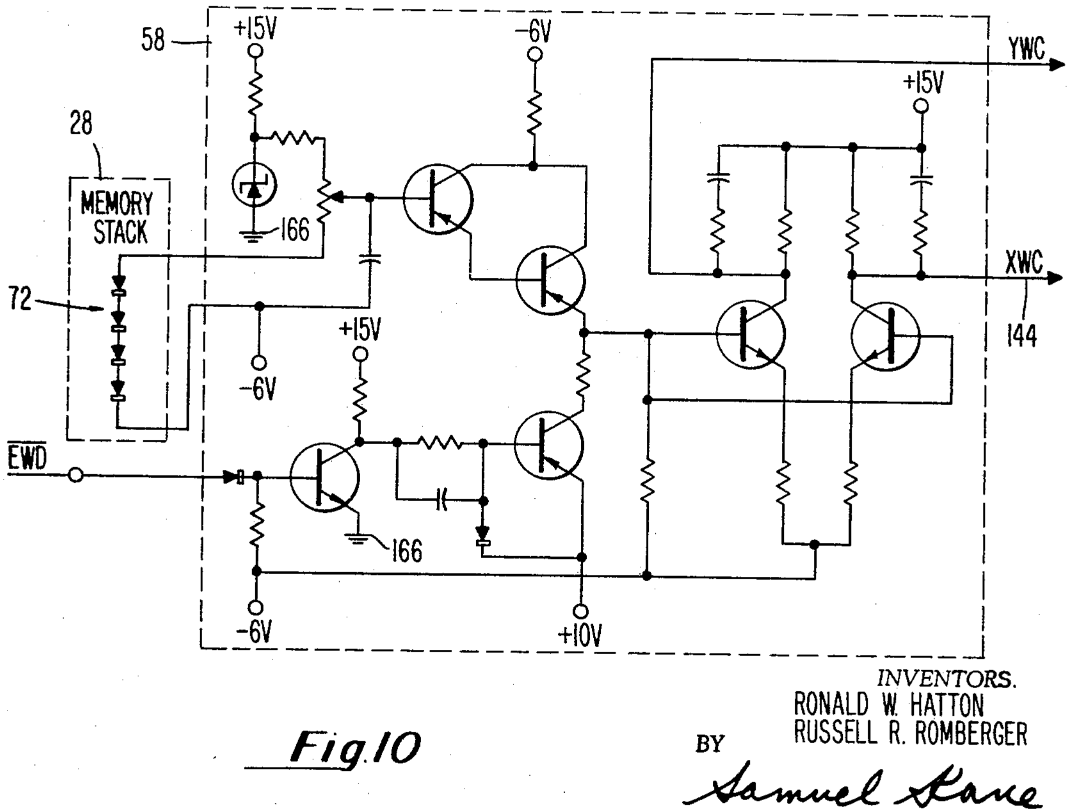
Figure 11:
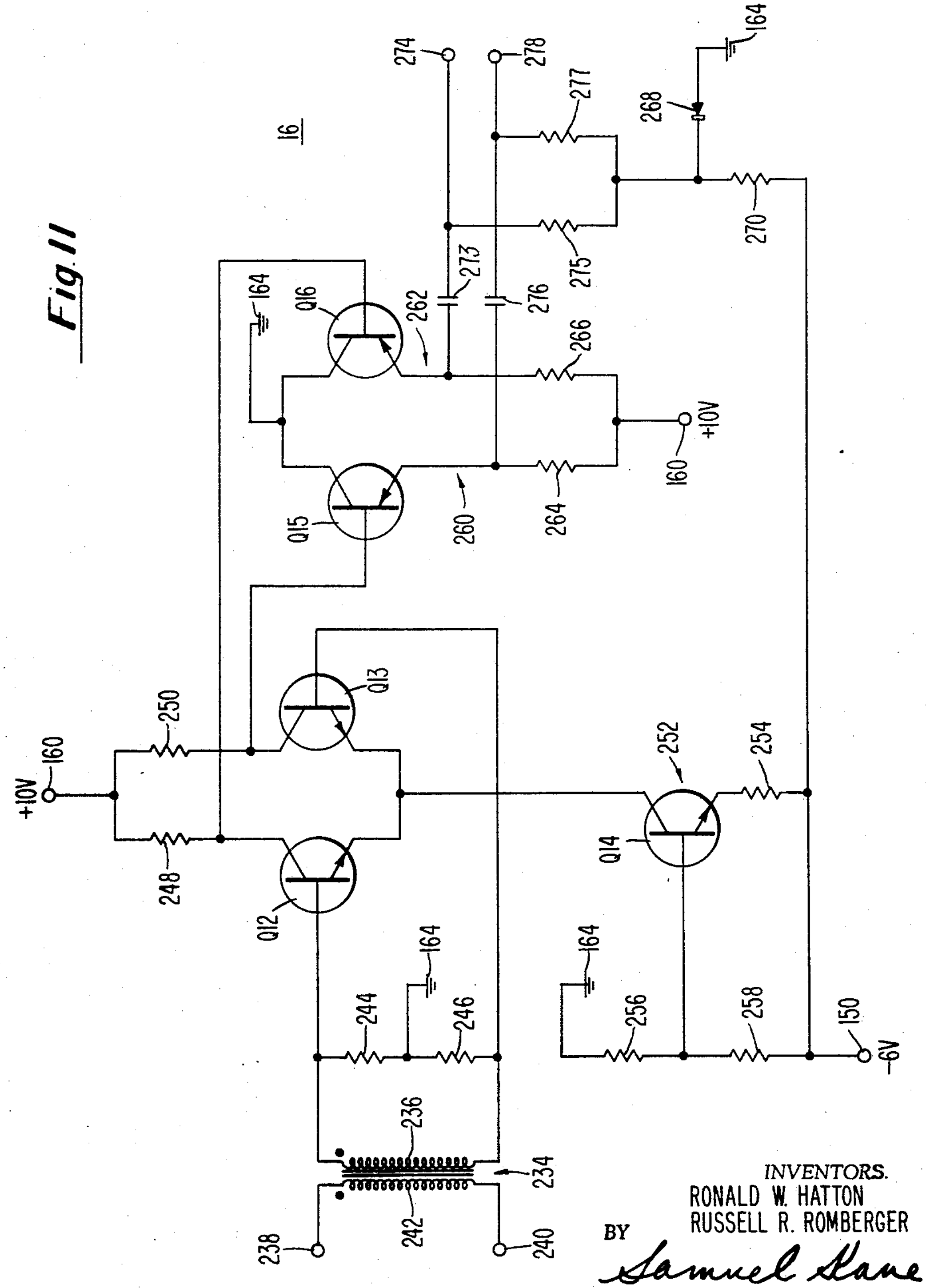
Figure 12:
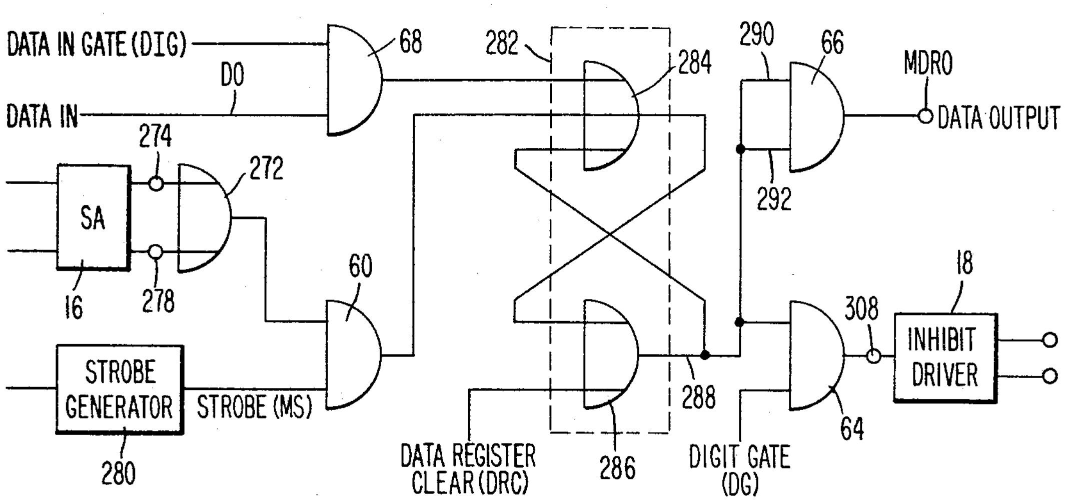
Figure 13:
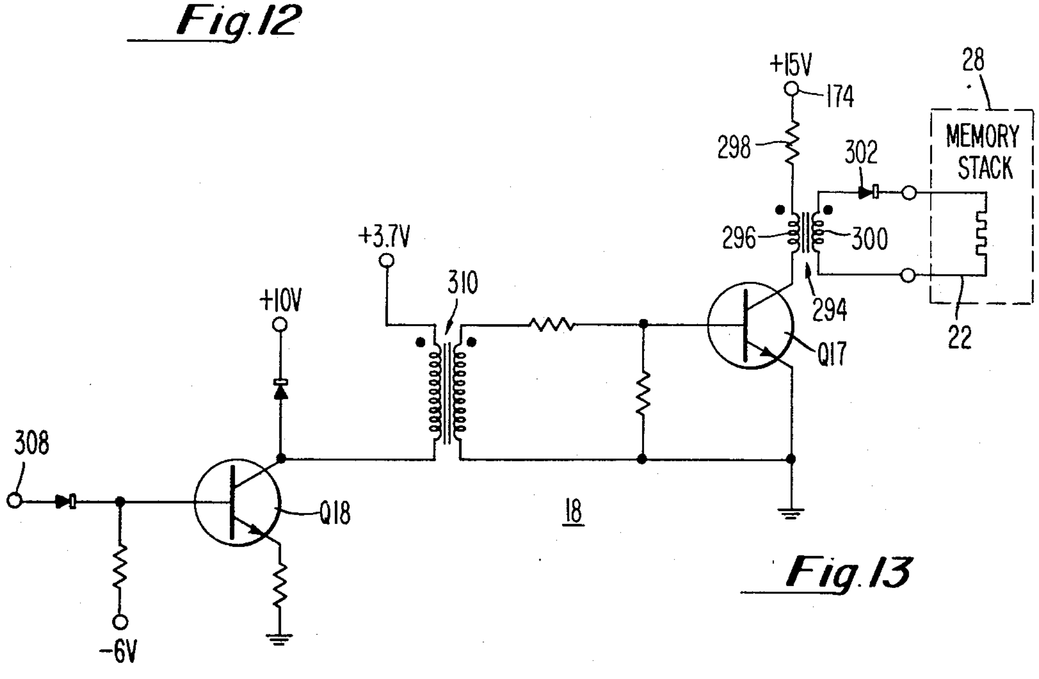
Figure 14:
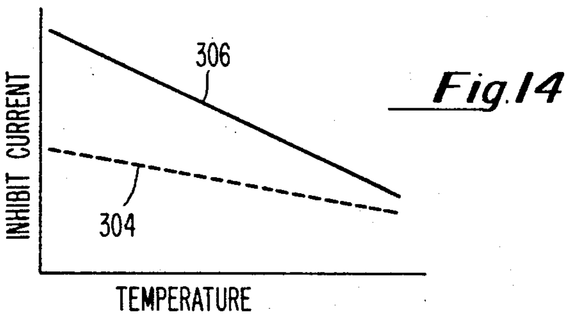
Figure 15:
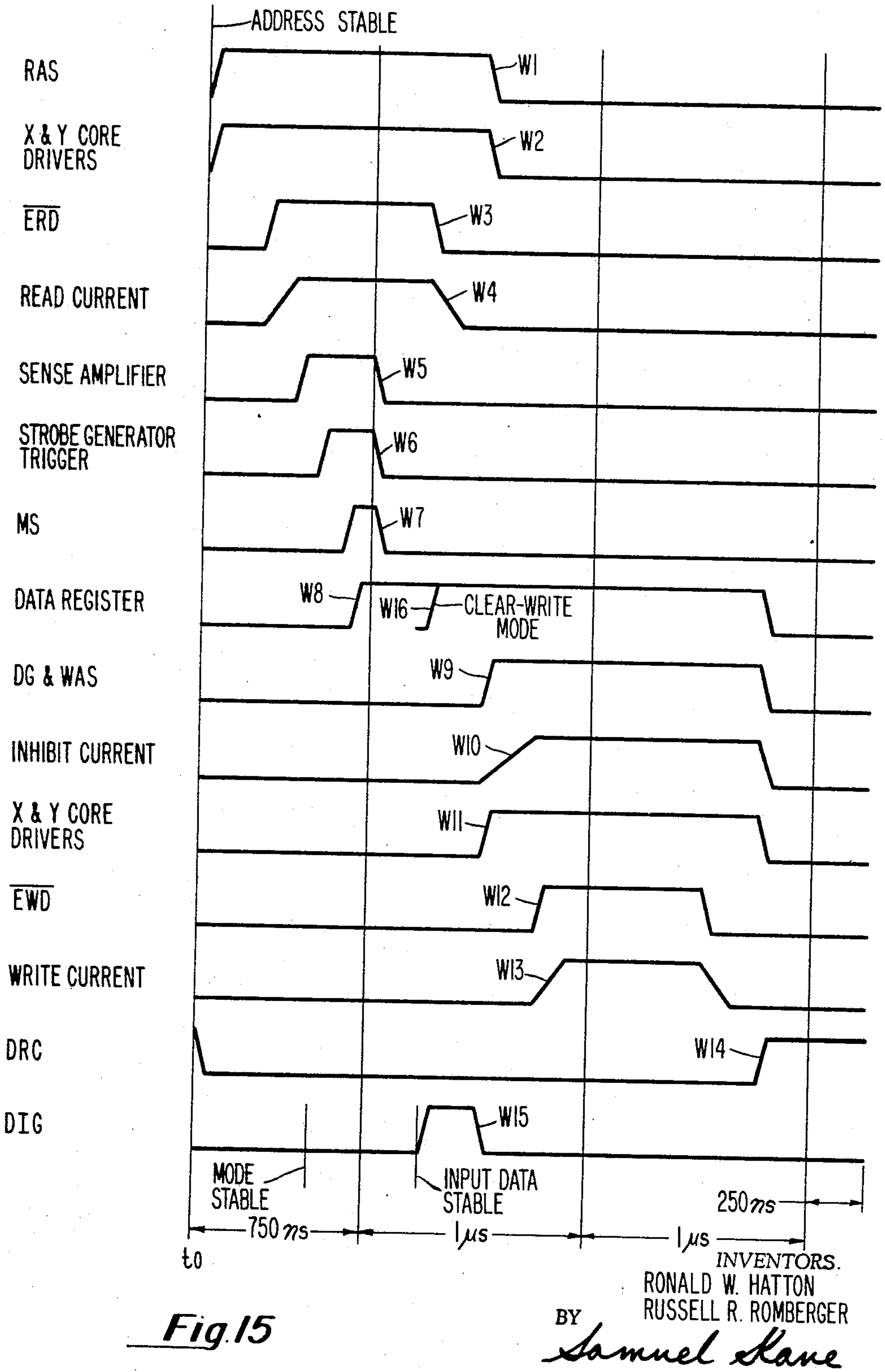

FIGS. 6A and 6B, when placed together as shown in FIG. 6, show one of the address decoder/core driver network modules and associated components;

FIG. 7 is a broken view of a diode selection matrix for the X drive lines shown in FIG. 3;

FIG. 8 shows two groups or pairs of core driving circuits, the leftward pair for driving read current through a selected drive line, and the rightward pair for driving write current through the same selected drive line;

FIG. 9 shows a current regulating and stabilizing network which cooperates with selected pairs of core drivers, such as the leftward pair shown in FIG. 8, for driving read current through a selected drive line;

FIG. 10 shows a similar current regulating and stabilizing network which cooperates with selected pairs of core drivers, such as the rightward pair shown in FIG. 8, for driving write current through a selected drive line;

FIG. 11 is a schematic diagram of one of the sense amplifiers;

FIG. 12 is a block diagram showing how the output of a sense amplifier is used in connection with read and write operations and in transmitting data to the associated computer, and also illustrates how new data is entered into the memory system;

FIG. 13 is a schematic diagram of one of the inhibit driver circuits and its associated inhibit line;

FIG. 14 shows current-temperature curves for compensated and uncompensated inhibit current; and FIG. 15 is a timing diagram for operation of the illustrated memory system.

A general description of the illustrated embodiment of the invention will now be given, and this will be followed by a detailed description.

Referring to FIG. 3 of the drawings, the invention uses a plurality of bistable state magnetic storage elements 10 and is adapted to be operated in the destructive read-out and coincident current modes, and in the read-restore and clear-write modes. While the invention was designed to be operated particularly in these modes, it is understood that at least some of the features of the invention may be used in memory systems using other modes of operation.

In the present embodiment of the invention, the magnetic storage elements 10 are in the form of ferrite toroidal magnetic cores, with each core 10 constituting one bit of a memory word. The invention is adaptable to memories of various word capacities, however, for purposes of illustration, the present embodiment of the invention is illustrated in a 4096 word, 25 bit memory.

The magnetic cores 10 are preferably arranged in matrices or bit planes 14, each of which contain 4096 of the magnetic cores. Thus, in the matrix shown in FIG. 3, the magnetic cores 10 are arranged in a 64 x 64 matrix, so that each row and each column of cores 10 contains 64 cores. Accordingly, there are sixty-four X drive lines designated octally from X00 to X77, each of which links all of the cores 10 in one row, and sixty-four Y drive lines designated octally from Y00 to Y77, each of which links all of the cores 10 in one of the columns of the matrix.

Each matrix 14 has associated with it a sense amplifier 16 and an inhibit driver 18. A sense line 20, which has its ends connected to the sense amplifier 16 links all of the cores 10 in the matrix, and an inhibit line 22 which has its end connected to the inhibit driver 18 also links all of the cores 10 of the associated matrix.

Figure 4:
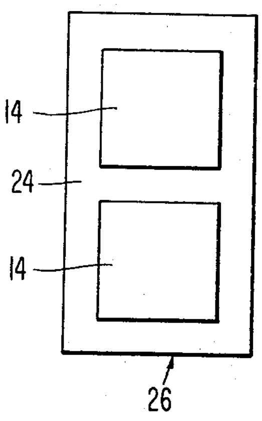
FIG. 4 is a diagrammatic plan view of a memory stack plane.
Figure 5:
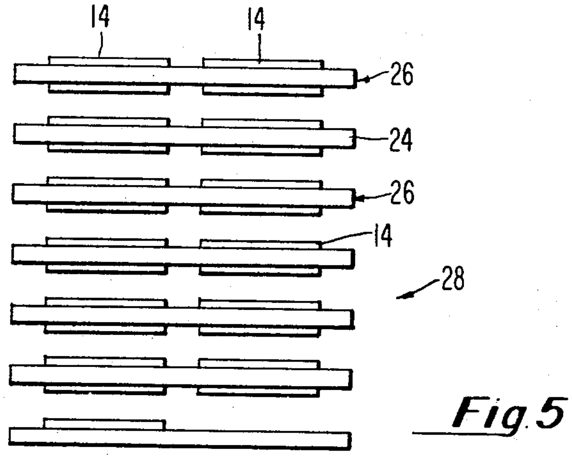
FIG. 5 is a diagrammatic view in which all of the stack planes of the memory, such as the one shown in FIG. 4, are arranged in elevation and in a stack formation.

In accordance with the illustrated bit capacity of the memory, there are provided 25 of the bit planes, or matrices 14, and these are illustrated diagrammatically in FIGS. 4 and 5 and are shown secured in groups of two to both sides of a supporting member 24. Each support 24 together with its four matrices 14 thereon constitutes a stack plane 26, and these stack planes are illustrated in FIG. 5 in a stack formation, and constitute the memory stack 28. The end or bottom one of the stack planes 26 contains only one of the matrices 14.

In the assembled condition of the memory stack 28, each X drive line links all of the cores in one row of each of the 25 matrices 14, and each Y drive links all of the cores in one of the columns of each of the 25 matrices 14. The manner of making the end connections of the X and Y drive lines will be described hereinafter. The arrows 30 on the drive lines indicate the current directions for write current, and if there is inhibit current the arrow 32 indicates the current direction for inhibit current.

In order to reduce noise and to reduce inductive coupling between the sense lines 20 and the other lines, the sense lines 20 may be linked to the cores 10 in various configurations. In the present embodiment of the invention, the sense lines 20 are so oriented relative to the cores 10 such that when certain of the cores 10 are switched they will induce signals in the sense lines 20 of one polarity, and when other cores 10 are switched they will induce signals in the sense lines 20 of the opposite polarity. As will appear more clearly hereinafter, each sense amplifier 16 is adapted to provide similar outputs for either polarity of signal which is induced in its associated sense line 20.

As may be perceived from the above description, one core 10 in each of the 25 matrices 14 which is common to or linked by an X drive line and an intersecting Y drive line represents one bit of the 25 bit word. Thus, whenever a word is selected for a read operation, read currents are caused to flow through the X drive line and the Y drive line that are common to the cores 10 of the selected word. These currents are of such polarity and magnitude that together the magnetic fields of the currents will switch the selected cores 10 to the ZERO state if they were in the ONE state. In a write operation for writing ONES into the cores, write currents are caused to flow in the selected X drive line and the selected Y drive line of such polarity and magnitude that together their magnetic fields will swtich the selected cores from the ZERO state to the ONE state. If it is required that any core 10 remain in the ZERO state during the write operation, then in such case inhibit current is caused to flow in the inhibit line 22 of such polarity and magnitude that it will cancel the total magnetic field of the write currents in the selected drive lines to such an extent as to prevent the particular core 10 from switching from the ZERO state.

In the present embodiment of the invention, the two read currents, and the two write currents, are both required for switching, and are preferably selected to be substantially equal in magnitude and of the kind known in the art as half-select currents.

In accordance with the coincident current mode of operation, the half-select currents which flow in the selected drive lines have at least a portion of their duration in time coincidence for switching the cores 10 from one state to the other.

In order to provide selection of one of the 4096 words or memory locations, a 12-bit address is transmitted to the memory system from an address register 34 (FIG. 1) of the associated computer. There is also provided an X selection matrix 36 for selecting the X drive lines and a Y selection matrix 38 for selecting the Y drive lines. It may be noted at this time that, since the circuits and operation for selecting the X drive lines are the same as those for selecting the Y drive lines, the description will be restricted, for the most part, to selection of the X drive lines and therefore the circuits for Y drive line selection have been omitted almost entirely from the drawings.

Three bits from the address register 34 are presented to an X suffix (XS) decoder 44 and three additional bits are presented to an X prefix (XP) decoder 46. This arrangement, together with the X selection matrix 36, a group of eight suffix read/write (R/W) switches 48 and a group of eight prefix read/write (R/W) switches 50, provides for selecting one of the X drive lines. Similarly, the remaining six bits from the address register 34 are presented to a Y suffix (YS) decoder 45 and a Y prefix (YP) decoder 47. This arrangement together with the Y selection matrix 38, a group of eight suffix read/write (R/W) switches 52 and a group of eight prefix read/write (R/W) switches 54 provides for selecting one of the Y drive lines.

The decoders 44, 45, 46 and 47 each comprises 16 AND gates only some of which, for X drive line selection, designated G1–G8, are shown in the drawings in FIGS. 6A, 6B and 7. These gates have four inputs, three for selection and one for timing. The timing inputs are a read address strobe signal RAS and a write address strobe signal WAS.

Each of the selection matrices 36 and 38 (FIG. 1) comprises 128 diodes of which 64 diodes are used in the read mode of operation, and 64 diodes are used in the write mode of operation.

In a read operation, the address is presented to the decoders 44, 45, 46 and 47. The decoders select the appropriate read/write switches so that read current is steered through the selection matrices 36 and 38 to the selected X drive line and the selected Y drive line. As will appear more clearly hereinafter, each of the read/write switches in each group 48, 50, 52 and 54 comprises two core driving circuits, one for read current and one for write current, and the timing is such that the core driver circuits are permitted to be substantially saturated before the application of drive current.

Read current is actuated by the application of a timing signal $\overline{\text{ERD}}$ to an X and Y read current regulator 56. The core drivers of the selected read/write switches remain substantially saturated until shortly after the read current is terminated. The X and Y read current regulator 56 is constructed so that it supplies read currents simultaneously in the selected X drive line and the selected Y drive line so that there is a summation of currents, and of their magnetic fields, which is effective to cause the cores 10 at their intersections to switch from the ONE state to the ZERO state, if they happened to be in the ONE state at the time of read.

In the illustrated embodiment of the invention, the read-out is destructive, so that the information is written back into the memory cores 10 on the next portion of the memory cycle. This is done by driving write currents through the selected X and Y drive lines. Selection of the word for the write operation is accomplished in the same manner as described above for selection for the read operation, except that write current is provided after substantial saturation of the core drivers for write by the application of a timing signal $\overline{\text{EWD}}$ to an X and Y write current regulator 58.

Information, in this embodiment of the invention, is read out from the memory to the 25 sense amplifiers 16 in the parallel mode. If a ONE is sensed by the sense amplifiers 16, the ONE data is applied to 25 strobe gates 60 and upon the application of a memory strobe timing signal MS the gates 60 will set a 25-bit data register 62. If the cores 10 being read out at the time of the read operation are in the ZERO state, the read-out voltage signals applied to the particular sense amplifiers 16 will be low in magnitude so that the sense amplifiers will not be effective to cause the data register 62 to be set. In this case, the storage elements of the data register 62 will remain in a reset condition, or ZERO state. The 25 storage elements in the data register 62 may take various forms, however, in the present embodiment of the invention they are constituted by 25 flip-flops.

If the data register flip-flops remain in the ZERO state, indicating a ZERO read-out, then a ZERO is written back into the memory cores 10 by energizing the inhibit drivers 18. The input to the inhibit drivers 18 is present when the data register flip-flops are in the ZERO state and a digit gate timing input signal DG is presented to 25 digit gates 64. The digit gate timing signal DG is applied shortly before the write operation begins. As indicated previously, the memory stack 28 is wired so that when inhibit current flows it effectively cancels one-half of the full drive current that is being applied by the X and Y write current regulator 58 to the selected X and Y drive lines so that the cores 10 do not switch, but remain in the ZERO state. Information is transmitted from the data register 62 to the associated computer via 25 data output gates 66 and their output lines MDR0–MDR24.

The memory function described above is the read-restore mode of operation. The invention is also applicable to the clear-write mode of operation in which information is read and cleared out of the memory, and then new information is entered into the memory. Entry of new information into the memory is accomplished by means of the same write process, described previously.

The new information enters the memory through 25 input lines D0–D24 and 25 data gates 68. The new information is fed into the data register 62 upon the occurrence of a data input gate timing signal DIG. It is noted that during the clear-write mode of operation, the memory strobe signal MS is not enabled, so that read-out information is disregarded and the data register 62 is not set by the output of the strobe gates 60. A data input gate timing signal DIG is applied to the data gates 68 in the clear-write mode of operation, in which case the memory strobe signal MS is not applied to the strobe gates 60. Application of the data input gate signal DIG is timed so that the data register 62 is set prior to the write operation.

The invention is capable of operating over a wide temperature range. For example, the illustrative embodiment has been designed in an actual system for operating over a temperature range of from −55° C. to +95° C. It is desirable, therefore, that some means of temperature sensing be provided and in the present embodiment of the invention this is accomplished by means of a temperature sensing network 70, shown in FIG. 9, for regulating read current, and a similar temperature sensing network 72, shown in FIG. 10, for regulating write current. The temperature sensing networks 70 and 72 are represented, respectively, in FIG. 1 by a temperature sensor (read) line 74 and a temperature sensor (write) line 76.

A timing and control unit 78 provides the various timing signals for operation of the memory system. A power inhibit line PI serves to inhibit the operation of the X and Y read and write current regulators 56 and 58 during power transitions, such as turning the associated computer on and off. $\overline{ERD}$ is an enable read driver signal that is used for enabling read current in the memory. $\overline{EWD}$ is an enable write driver signal that is used for enabling write current in the memory. A data register clear signal DRC is used to reset the data register 62 to the ZERO state at the conclusion of both the read-restore and clear-write modes of operation so that it is ready for the next read operation.

The timing and control unit 78 consists of a counter and decoder to give the proper timing inputs to the memory system. The inputs to the timing and control unit 78 from the associated computer include a mode control input MC, an initiate memory cycle input IMC, and a clock input CL(4MC). The mode control input MC designates whether the memory system is to operate in either the read-restore or the clear-write modes. The clock input CL(4MC) is used for timing the counter that is in the timing and control unit 78. The clock input is in the form of two lines which carry half microsecond pulses displaced by 250 nanoseconds and used as a timing base for the timing and control unit 78.

Turning now to the detailed description, and referring first to FIGS. 6A and 6B, the address register 34 consists of a plurality of storage elements which in the present embodiment are in the form of flip-flops F1–F12, each of which constitutes one of the bits of the address register. Each of a like number of current amplifying buffer circuits B1–B12 has its input circuit connected to the ONE side of one of the flip-flops F1–F12. The six flip-flops F1–F6 and their associated buffer circuits B1–B6 are used for decoding the X drive lines. The flip-flops F7–F12 and their associated buffer circuits B7–B12 are used for decoding the Y drive lines. As will appear more clearly hereinafter, each three flip-flops such as F1–F3, F4–F6, F7–F9 and F10–F12 is decoded octally to select one of eight read/write switches.

Except for the address register 34, the buffer circuits B1–B12, two Tables 80 and 82, and two circuits in dotted blocks 84 and 86, the circuitry shown in FIGS. 6A and 6B constitutes one of four network modules for X drive line selection. The four network modules are designated M1–M4 and are listed in Tables 80 and 82. Circuitry for network module M1 is illustrated in FIGS. 6A and 6B. Since the circuitry and operation of all four network modules M1–M4 are the same, for purposes of simplicity the circuitry for the network modules M2–M4 have been omitted from the drawings. There are also provided four similar network modules for the Y drive line selection, however, since their construction and operation are the same as those for the X drive line selection they, too, have been omitted from the drawings since, as indicated previously, the description will be directed to the circuitry for X drive line selection only.

Each of the buffer circuits B1–B6 provides an output which is at the same voltage level as the ONE side of its associated flip-flop, and these outputs are designated respectively as 88, 89, 90, 91, 92 and 93, and therefore they correspond to the ONE side of the associated flip-flops. The buffers B1–B6 also invert their outputs 88–93 and provide second outputs designated $\overline{88}$, $\overline{89}$, $\overline{90}$, $\overline{91}$, $\overline{92}$ and $\overline{93}$, each of which therefore corresponds to the ZERO side of the associated flip-flop.

Since only one of the four network modules M1–M4 has been illustrated in the drawings, the Tables 80 and 82 have been provided to show how the output circuits of the buffers B1–B6 are connected to the gates G1–G8 of each of the four network modules M1–M4.

Thus, for example, with respect to network module M1, which is illustrated in FIGS. 6A and 6B, Table 80 shows that the output circuits $\overline{88}$, $\overline{89}$ and $\overline{90}$ of buffers B1–B3 are connected respectively to lead lines 94, 95 and 96, and therefore they provide inputs to gate G1 and G4. The output circuits $\overline{88}$ and $\overline{89}$ also provide inputs to gates G5 and G8. The output circuits $\overline{91}$, $\overline{92}$ and $\overline{93}$, respectively, of the buffers B4, B5 and B6 are shown by Table 80 to be connected, respectively, to lead lines 97, 98 and $\overline{99}$, and therefore provide inputs to gates G2 and G3. The outputs $\overline{91}$ and $\overline{92}$ also provide inputs to gates G6 and G7. Further, with respect to network module M1, Table 82 shows that outputs 90 and 93 of buffers B3 and B6, respectively, which correspond to the ONE side of the associated flip-flops F3 and F6, are connected to lead lines 100 and 101, respectively, and therefore provide inputs to gates G5 and G8, and to G6 and G7, respectively.

Since there are four network modules M1–M4 for X drive line selection, and also four similar network modules for Y drive line selection, there will in each case be four sets of gates G1–G8 so that there will be 32 gates for X drive line selection and 32 gates for Y drive line selection. FIG. 7 illustrates a diode selection matrix for X drive line selection and which also represents the 32 gates for X drive line selection. For purposes of simplicity, the matrix has been shown as a broken view, and therefore all 32 of the gates are not shown in FIG. 7.

The X drive lines (FIG. 3) are again illustrated in FIG. 7, but in this figure they are arranged in the form of a matrix in rows and in columns. Since FIG. 7 is a broken view, all sixty-four X drive lines are not shown. However, the top row of X drive lines consists of drive lines X00, X01, X02, X03, X04, X05, X06 and X07. Also, the leftward column of drive lines consists of drive lines X00, X10, X20, X30, X40, X50, X60 and X70. Thus, the sixty-four X drive lines represented by FIG. 7 are in the form of an 8 x 8 matrix.

The X drive line matrix is associated with a matrix of diode pairs, each pair similar to the diodes *d*1 and *d*2, and which constitutes the X selection matrix 36 (FIG. 1) consisting of 128 of these diodes. The diode pairs (FIG. 7) are also arranged in rows and in columns, similar to the matrix of X drive lines, with each pair of these diodes connected to one end of one of the X drive lines. Thus, for example, the cathode of diode *d*1 and the anode of diode *d*2 are interconnected and are connected at their junction to the lower end of the X drive line X00.

Each column of X drive lines has its opposite or upper end connected to one of eight column lines 102–109, and each of these column lines 102–109 may also be referred to as an X suffix point since it represents the point at which all of the X drive lines in the particular column are interconnected. As will appear more clearly hereinafter, all of the X drive lines connected to a common suffix point represent a particular suffix number.

There is also provided for each column of X drive lines a supplementary pair of diodes such as the diodes 110 and 111, of which there are 16 diodes designated 110–125.

The diodes of each pair of diodes such as the diodes 110 and 111 are similarly connected to an X suffix point or column line, such as column line 102. Thus, the diode 110 has its cathode connected to the X suffix point 102 and the diode 111 has its anode connected to the X suffix point 102.

One diode of each pair of matrix diodes in the upper row, such as the diode *d*1 or *d*15, has its anode connected to an X write prefix line 126, and the other diode of each pair of diodes in the same row of pairs, such as the diode *d*2 or *d*16, has its cathode connected to an X read prefix line 127. Each row of X drive lines in the matrix similarly has a pair of X write and X read prefix lines associated with it, similar to the lines 126 and 127, the bottom row of X drive lines similarly being associated with an X write prefix line 140 and an X read prefix line 141.

The prefix lines or row conductors such as the lines 126, 127, 140 and 141 are connected individually to a core driver circuit in the associated prefix read/write switch of the group of switches 50. There is one core driver circuit for each of the gates G1–G8 in each of the four network modules M1–M4. The core driver circuits for network module M1 are shown in FIGS. 6A and 6B in dotted blocks and are identified consecutively from CD–1 to CD–8. Thus, each pair of prefix lines, such as the lines 126 and 127 (FIG. 7) are connected individually to one of the core drivers, the line 126 being connected to the core driver CD–1 for generating write current, and line 127 being connected to the core driver CD–4 for generating read current.

Accordingly, there are two core driver circuits included in each X prefix read/write switch of the group 50, and the group or column of read/write switches 50 are designated individually in FIG. 7 from 50–0 to 50–7. Thus the last number of the reference characters 50–0 to 50–7 of the column of X prefix read/write switches, namely, numbers 0 to 7, constitute prefix numbers. Similarly, the last number of the X suffix read/write switches identified individually in FIG. 7 from 48–0 to 48–7, run similarly from 0 to 7 and these constitute suffix numbers. Each of the X suffix read/write switches 48–0 to 48–7 also includes two core driver circuits, one for generating read current and one for generating write current, and these two core driver circuits are connected individually to a pair of the supplementary diodes, such as the diodes 110 and 111, or the diodes 124 and 125.

In order to select a particular X drive line for a memory cycle, which consists of sequentially driving read and write current through the selected drive line, it is only necessary to select the particular X prefix read/write switch and the particular X suffix read/write switch whose prefix number and suffix number, respectively, are the same as the last two numbers of the reference character which identifies the particular X drive line to be selected. Thus, if the X drive line X00 is to be selected, it is only necessary to select the read/write switch 50–0 and the read/write switch 48–0.

Accordingly, network module M1 can select X drive lines X00, X01, X10 and X11. Network module M2 can select X drive lines X22, X23, X32 and X33. Network module M3 can select X drive lines X44, X45, X54 and X55. Network module M4 can select X drive lines X66, X67, X76 and X77. To select any other X drive line requires a combination of the appropriate read/write switches of two of the network modules M1–M4, as is readily understood. For example, to select X drive line X07 requires a selection of read/write switch 50–0 of network module M1 and read/write switch 48–7 of network module M4.

A typical read operation might involve, for example, the selection of AND gates G2 and G4. This will occur for these particular gates when the ZERO sides of the flip-flops F1–F6 are at approximately zero volts or ground, which in the present embodiment of the invention has been chosen to be the true logic level. In this case the inputs to the gates G2 and G4 via the lines 94, 95, 96, 97, 98 and 99 will therefore also go true, so that when the true read address strobe timing signal RAS is applied to the gates G2 and G4, their output circuits will move to a positive voltage level, which in this embodiment of the invention has been chosen to be the false logic level. The core driver circuits CD–2 and CD–4, which are associated with the gates G2 and G4, will be actuated by their positive output voltages into a substantially saturated condition, as will appear more clearly hereinafter, so that read current will flow subsequently upon the actuation of the X and Y read current regulator 56 by the timing signal $\overline{\text{ERD}}$. Current will then flow through the selected X drive line, which in this illustrative case is the drive line X00, as follows. Read current will flow from the core driver CD–2 which is in the read/write switch 48–0 (FIG. 7) and through diode 110, the suffix point or column line 102, the drive line X00, diode *d*2, the core driver CD–4 which is in the read/write switch 50–0, and then down through a line 142 to the X and Y read current regulator 56.

A write operation is accomplished while the same address is still present and applied to the AND gates G1 and G3. In this case, upon the occurrence of the write address strobe timing signal WAS at a true or ground voltage level, the outputs of the gates G1 and G3 will similarly go positive to actuate their associated core driver circuits CD–1 and CD–3 into a substantially saturated condition, so that when the X and Y write current regulator 58 is subsequently actuated by the timing signal $\overline{\text{EWD}}$, write current will flow through the selected X drive line X00 as follows. Current will flow from the core driver CD–1 which is in the read-write switch 50–0 and through the diode *d*1, the drive line X00, diode 111, the core driver CD–3 which is in the read/write switch 48–0 and out through a line 144 to the X and Y write current regulator 58.

In the illustrated embodiment of the invention, the core driver circuits are constructed and operated in the same manner for read and write operations for both X line selection and Y line selection. As indicated previously, there are two core driver circuits for the read operation for selecting a particular drive line, and two core driver circuits for the write operation for selecting the same drive line. Thus, selecting a particular X drive line, or a particular Y drive line, for a memory cycle involves the use of four core drivers.

The four core drivers CD–1 to CD–4, which were referred previously, are illustrated in FIG. 8 together with the X drive line X00 which they serve. Since all of the core drivers are the same, a detailed description will first be given of only one of the core drivers, after which will be described the interaction of the two core drivers for the read operation, and then this will be followed by a description of the interaction of the two core drivers for the write operation.

Core driver CD–2, for example, utilizes two transistors Q1 and Q2 which in the quiescent state are turned off. A diode 146 and one end of a resistor 148 are connected to the base electrode of the transistor Q1. The other end of the resistor 148 is connected to a source of negative potential 150. The collector electrode of transistor Q1 is connected to the anode of a diode 152 and to one end of the primary winding 154 of a transformer 156, the other end of the primary winding being coupled to a source of positive potential 158. The cathode of diode 152 is connected to a source of positive potential 160. The emitter electrode of transistor Q1 is connected to one end of a resistor 162, the other end of which is returned to a source of reference potential, or circuit ground 164. As will appear hereinafter, the invention preferably also utilizes a second point of reference potential, or memory ground 166 (FIGS. 9 and 10, for example). Physically, these two grounds, 164 and 166, in the present embodiment of the invention are ground buses, and the purpose of providing two grounds is to keep the high frequency, high currents associated with the memory ground bus 166 out of the circuit ground bus 164.

A resistor 168 (FIG. 8) is connected between one end of the secondary winding 170 of the transformer 156 and the base electrode of transistor Q2, and a resistor 172 is connected between the base and emitter electrodes of transistor Q2. The collector electrode of transistor Q2 is coupled to a source of positive potential 174 and its emitter electrode is connected along one path to one end of a resistor 176 whose opposite end is connected to the source of negative potential 150, and along another path to the anode of diode 110.

When the output of the gate G2 goes to a false or positive voltage level it will turn transistor Q1 on, thereby causing current to flow through the primary winding 154 of the transformer and causing transistor Q2 to turn on by reason of base current supplied to it from the secondary winding 170 of the transformer. Transistor Q2 is driven substantially into saturation with current flowing through it from the source 174, and through parallel paths one of which includes the resistor 176 and the source of negative potential 150, and the other of which includes the diode 110, the resistor 145, and positive source of potential 160. Core driver CD–4 responds similarly to the positive output level of gate G4 so that its transistor Q3 is similarly driven into substantial saturation. Current flow through transistor Q3 will be from the source of positive potential 174 and a resistor 180, and then through a resistor 182 to the source of negative potential 150. Read current, however, will not yet flow through the selected X drive line X00 until the timing input $\overline{\text{ERD}}$ is applied to the X and Y read current regulator 56.

During quiescence, the diodes $d1$, $d2$, 110 and 111 are reverse biased. When transistor Q2 turns on, diode 110 will be forward biased but diode $d2$ will remain reverse biased. Diodes $d1$ and 111 will also remain reverse biased. However, when the X and Y read current regulator 56 is turned on diode $d2$ will become forward biased so that read current will now flow from the source 174 and through transistor Q2, diode 110, the X suffix point 102, the selected X drive line X00, diode $d2$, the X read prefix line 127, transistor Q3, a diode 178 and the line 142 leading to the X and Y read current regulator 56. The unselected diodes connected to the same prefix line 127 will be slightly forward biased so that approximately three milliamperes of current will flow through their associated drive lines, which is not objectionable.

Since there are 64 core driver circuits for both X line selection and Y line selection, and only two current regulators 56 and 58, the output stage transistors of the core drivers, such as Q2 and Q3 are preferably permitted to substantially saturate, as indicated previously, before the particular current regulator 56 or 58 is turned on in order to keep the power dissipation of all the core driver circuits as low as possible.

A transformer, such as the transformer 156 in core driver CD–2, is used to couple the first and second stages of each core driver circuit to allow the use of a low voltage supply, such as the supply 158, for developing the drive. The use of such a transformer also keeps the power drain to a minimum, since a higher voltage supply would be necessary if the core driver was direct coupled.

Each transformer, such as the transformer 156 has an additional advantage in that all base current which is supplied to the output stage transistor, such as transistor Q2, is contained in the base circuit and does not flow down through the associated drive line in the memory stack. This mode of operation results in a more accurate regulation of the current in the drive line by the particular current regulator 56 or 58.

Another advantage of these transformers is that in case of a timing failure the base drive to the output transistors can only occur for a short period of time since the transformers will support base drive for only a short time. This type of failure could occur, for example, if there were a loss in the timing input, or a failure in the timing input, that would result in any diode, such as the diode 146, being forward biased continuously. The resistor 162 in the emitter circuit of transistor Q1 offers some means of protection in case of a loss in timing input. If the timing input remains high for a long period of time, the transformer 156 will run out of primary inductance and a large current will be developed in the primary winding 154. Placing the resistor 162 in the emitter of transistor Q1 will result in the transistor Q1 being cut off when this occurs.

The diodes in the primary circuits of the transformers, such as the diode 152 in the core driver circuit CD–2, are used to clamp the back-swing voltage on the respective transformers and prevent the voltage which appears on the secondary winding of the particular transformer from going above a predetermined value, which in the present embodiment of the invention is −5 volts. The resistor 172 serves to critically damp the transformer 156 during the time that diode 152 ceases conduction.

The operation of driving write current through the illustrative X drive line X00 is accomplished in a similar manner as for driving read current through this drive line. Thus, when the outputs of gates G1 and G3 move to a false or positive voltage level, the output stage transistors Q4 and Q5 of core drivers CD–1 and CD–3 will be permitted to substantially saturate, as described previously for the read operation. Diode $d1$ will be forward biased and the other three diodes $d2$, 110 and 111 will remain reverse biased. A small amount of current, approximately five milliamperes, will flow from the positive source 174, through transistor Q4, the X write prefix line 126, diode $d1$, the X drive line X00, resistor 145 and the positive source 160. Upon the application of the timing signal $\overline{\text{EWD}}$ to the X and Y write current regulator 58, diode 111 will be forward biased and full write current will flow from the positive source 174, and through transistor Q4, the X write prefix line 126, diode $d1$, the X drive line X00, the X suffix point 102, diode 111, transistor Q5, and a diode 184 which is connected to the line 144 leading to the X and Y write current regulator 58. The unselected diodes connected to the same prefix line 126 will be slightly forward biased so that approximately five milliamperes of current will flow through their associated drive lines, which is not objectionable.

The X and Y read current regulator or stabilizer 56 and the X and Y write current regulator or stabilizer 58 compensate the drive currents over the full predetermined temperature range. The current regulator 56 for read is illustrated in FIG. 9 and the current regulator 58 for write is illustated in FIG. 10. Since the construction and operation of these two regulators is the same, the description will be restricted to the construction and operation of the read current regulator 56 only.

The temperature sensing network 70 includes one or more asymmetrical current conducting devices, which in the present embodiment of the invention are in the form of diodes 186. The number of diodes 186 used in any particular memory system depends upon the amount of temperature compensation that may be required for the particular type of magnetic storage elements, such as the magnetic cores 10, that are selected for the system. The present embodiment of the invention utilizes four of the diodes 186 in accordance with the particular temperature range over which the memory system is required to operate.

The temperature sensing diodes 186 are in a voltage divider network in which they are in series with the voltage source 174, a resistor 188, a resistor 190 and a potentiometer resistor 192 which constitute a voltage reference network, and the source of negative potential 150. A temperature compensated Zener diode 194 connected between the junction of the resistors 188 and 190 and the memory ground 166 serves to keep voltage fluctuations across the resistor network 190 and 192 to a minimum, since any fluctuations in the source of voltage supply 174 would result in large changes in current in the voltage divider circuit. The potentiometer 192 is used for initially setting the current at the output of the stabilizer circuit 56 and to make up for tolerances in the circuit elements.

A Darlington circuit comprising transistors Q6 and Q7 is used to present a high impedance to the voltage reference network comprising the resistors 190 and 192. This high impedance is necessary so that current flow through the temperature sensing diodes 186 is kept constant. As indicated by the dotted block 28, the temperature sensing diodes are located in the memory stack 28.

The output circuits of the stabilizer 56 comprise two constant current generator stages, one of which includes a transistor Q8 and a resistor 196 connected between its emitter electrode and the negative source of potential 150, and the other of which includes a transistor Q9 and a resistor 198 connected between its emitter electrode and the source of negative potential 150.

A gating network in the current regulator 56 comprises two transistors Q10 and Q11. The cathode of a diode 200 and one end of a resistor 202 are connected to the base electrode of the transistor Q10, the other end of the resistor 202 being returned to the negative source of potential 150. The emitter electrode of transistor Q10 is returned to the memory ground 166 and its collector electrode is coupled to the positive source of potential 174 through a resistor 204. A resistor 206 is connected between the collector electrode of transistor Q10 and the base electrode of transistor Q11 and a speed-up capacitor 208 is shunted across the resistor 206. A diode 210 is shunted across the base and emitter electrodes of the transistor Q11. A biasing resistor 214 is connected at one end to the base electrodes of transistors Q8 and Q9 and the emitter electrode of transistor Q7, and at its opposite end to the source of negative potential 150.

Variations in output current of the current regulator 56 are obtained by making use of the characteristics of the diodes 186. At the temperatures, the forward voltage drop across the four series-connected diodes 186 increases, and at high temperatures the forward voltage drop decreases. Therefore the voltage of the base electrode of transistor Q6, which is connected to the potentiometer arm 216 will be more positive at low temperatures and less positive at high temperatures. A capacitor 218 connected between the base electrode of transistor Q6 and the source of negative potential 150 serves to reduce the effects of fast transients, such as noise, on the base electrode of transistor Q6.

During quiescence, the diode 200 is slightly forward biased so that a small amount of current is flowing through it and through the resistor 202 since the input at terminal 219 is at this time at ground, or true voltage level. However, transistor Q10 is turned off, as are all the other transistors Q6, Q7, Q8, Q9 and Q11. When the timing signal $\overline{\text{ERD}}$ is applied to the input terminal 219, the anode of diode 200 is driven positive so that base current flows through transistor Q10. Transistor Q10 saturates and turns transistor Q11 on. Base current flows from the supply 160 and through the base-emitter junction of transistor Q11, through resistor 206 and through transistor Q10. Base current for transistors Q8 and Q9 is supplied from the positive voltage source 160 and flows through transistor Q11, resistor 212, transistors Q8 and Q9 and their associated resistors 196 and 198 to the source of negative potential 150. Current will also flow from the resistor 212 and through the resistor 214 to the source of negative potential 150.

As current flow from transistor Q11 increases, the voltage of the emitter electrode of transistor Q7 will rise until a level is reached at which transistors Q6 and Q7 will turn on, so that current will flow through these and a resistor 215 connected between their collector electrodes and the negative source 150. This level, which is the same as the voltage on the bases of transistors Q8 and Q9, depends upon the reference level set up on the base electrode of transistor Q6, since the base voltages of transistors Q8 and Q9 are always two base-to-emitter drops more positive than the base voltage of transistor Q6. At low temperatures, the emitter voltage of transistor Q7 will be more positive than at high temperatures, therefore, the quantity of current in the output circuits is made a function of temperature.

Because of the inductance of the selected X drive line to which the line 142 is coupled, and because of the inductance of the selected Y drive line to which the line 220 is coupled, the proper collector currents cannot flow immediately in the drive lines. In order that the proper collector current will flow immediately in transistors Q8 and Q9, these transistors are provided with similar resistor-capacitor networks 221 and 227. Thus, for the transistor Q8, the network 221 includes two resistors 222 and 224 and a capacitor 226, and is connected between the collector electrode of transistor Q8 and the source of positive potential 174, and for the transistor Q9, the network 227 includes two resistors 228 and 230 and a capacitor 242, and is similarly connected between the collector electrode of transistor Q9 and the source of positive potential 174. The networks 221 and 227 serve to keep transistors Q8 and Q9 out of saturation. They also provide a means for controlling the rise time of the currents within the respective drive lines, and for substantially terminating the drive lines in their characteristic impedance. Current continues to rise in the selected X and Y drive lines until the value of the currents demanded by the constant current stages is reached, and these constant currents are determined by the base voltages of transistors Q8 and Q9 and the values of their emitter resistors 196 and 198. Current in the selected drive lines is constant throughout the time that the timing input signal $\overline{\text{ERD}}$ is present.

When the timing signal $\overline{\text{ERD}}$ is terminated, transistor Q10 turns off and a reverse bias again appears across the base-emitter junction of transistor Q11. Transistors Q6 and Q7 turn off and base drive to transistors Q8 and Q9 ceases, so that these transistors also turn off. The resistor-capacitor networks 221 and 227 also serve as damping circuits for the selected drive lines.

Variations in the drive line currents that would normally be encountered by the variation in the voltage supply 150 are eliminated in this embodiment of the invention by using the same voltage supply 150 for the reference circuit which contains the diodes 186 as for the constant current stages which use the transistors Q8 and Q9. In this embodiment, the voltage supply 150 is −6 volts, and if this particular voltage supply should go more negative, more current would be demanded in the output stages since the voltage drops across resistors 196 and 198 would increase. However, since the same −6 volt supply is also used in the reference circuit containing the diodes 186, the reference voltage on the base of transistor Q6 would also go more negative so that a constant voltage drop is seen across resistors 196 and 198 and which does not depend upon the regulation of the −6 volt supply.

As indicated earlier in this disclosure, read current in the line 142 for the selected X drive line and read current in the line 220 for the selected Y drive line are provided over a wide temperature range. In the present embodiment of the invention, each of these currents is nominally 370 milliamperes at −55° C., 330 milliamperes at +25° C., and 300 milliamperes at +95° C. Write currents supplied by the stabilizer 58 (FIG. 10) have the same values. The temperatures referred to are temperatures of the memory stack 28.

One of the sense amplifier circuits 16 is illustrated in FIG. 11 and comprises a transformer 234 whose secondary winding 236 is connected to the base electrodes of two transistors Q12 and Q13. The input terminals 238 and 240 of the transformer primary winding 242 are adapted to be connected to the ends of a sense line 20 (FIG. 3).

The transformer 234 increases the common mode input impedance of the sense amplifier 16 and reduces the effect of sense line to drive line capacitance. Preferably, the primary to secondary turns ratio of the transformer 234 in the illustrated embodiment of the invention was chosen to be 1 to 2 so that the input impedance transferred to the primary circuit would represent the characteristic impedance for the particular sense line 20. The sense line 20 is terminated in its characteristic impedance by two resistors 244 and 246 which are connected at one end to the secondary winding 236 and at their junction to the circuit ground 164.

The transistors Q12 and Q13 together with their load resistors 248 and 250, and a constant current generator stage 252 in their emitter circuit constitute a difference amplifier. The constant current generator 252 includes a transistor Q14 and a resistor 254 which is returned to the negative source of potential 150. A resistor 256 is connected at one end to a resistor 258 and at its opposite end to the circuit ground 164. The resistor 258 is returned to the source of negative potential 150, and the junction of the two resistors 256 and 258 is connected to the base of transistor Q14. The resistors 256 and 258 are used for setting the bias at the emitters of transistors Q12 and Q13, and to insure that these two transistors remain in class A operation.

Two emitter-follower circuits 260 and 262 are used to present a high impedance load to the difference amplifier. The emitter-follower 260 includes a transistor Q15 and a resistor 264 connected between its emitter electrode and the positive source of potential 160. The emitter-follower 262 includes a transistor Q16 and a resistor 266 connected between its emitter electrode and the positive source of potential 160. The collector electrodes of transistors Q15 and Q16 are interconnected and coupled to the circuit ground 164. The base electrodes of transistors Q15 and Q16 are connected, respectively, to the collector electrodes of transistors Q13 and Q12.

The threshold of the sense amplifier 16 is established by a diode 268, a resistor 270 connected between the cathode of the diode 268 and the source of negative potential 150, and the base-to-emitter voltage of a transistor, not shown, but which is contained in an OR gate 272 (FIG. 12) which is driven by the sense amplifier 16. The threshold thus established is such that the gate 272 is reverse biased. The anode of diode 268 is returned to the circuit ground 164.

A capacitor 273 is connected between the emitter electrode of transistor Q16 and an output terminal 274 which provides one input to the OR gate 272, and a capacitor 276 is connected between the emitter electrode of transistor Q15 and an output terminal 278 which also provides an input to the OR gate 272. Two resistors 275 and 277 provide discharge paths for the capacitors 272 and 276.

Two outputs are required from each sense amplifier 16 since, as described earlier, read-out of magnetic cores 110 that are storing ONE's may result in induced signals in the associated sense line 20 of either polarity, and the sense amplifiers 16 must respond similarly to signals of both polarities.

The sense amplifier 16 operates as follows. It will be assumed, first, that a magnetic core 10 which is storing a ONE is switched to the ZERO state during read-out, and that its flux change induces a signal in the associated sense line 20 of such polarity that when transmitted to the sense amplifier 16 through the transformer 234, the base voltage of transistor Q12 will be positive, and the base voltage of transistor Q13 will be negative. Collector current of transistor Q12 will increase and collector current of transistor Q13 will decrease, since the sum of these two currents must be the same at all times. This is necessarily so because of the constant current stage 252.

The increase in collector current in transistor Q12 causes a negative-going voltage to appear at the base of transistor Q16, therefore, the voltage at the emitter of transistor Q16 will also move in the negative direction. The decrease in collector current in transistor Q13 will cause a positive-going voltage to appear at the base of transistor Q15 causing the voltage at the emitter electrode of transistor Q15 also to move in the positive direction. This positive excursion at the emitter of transistor Q15 will be transmitted through the coupling capacitor 276 to the output terminal 278 and will be of sufficient magnitude to turn on the transistor, not shown, which is connected to the output terminal 278 and which is contained in the OR gate 272 (FIG. 12).

If the read-out signal results in a positive voltage at the base of transistor Q13 (FIG. 11), and a negative voltage at the base of transistor Q12, the result will be a positive-going output signal at the terminal 274 and a negative-going output signal at the terminal 278. Thus, the OR gate 272, which responds to a positive-going signal at either of the output terminals 274 or 278 will invert the positive or false input and provide a true output, which as mentioned earlier is at approximately zero or ground voltage level.

If a magnetic core 10, which is to be read out, is already in the ZERO state, it will not switch at read-out but will, nevertheless, induce a small signal into the associated sense line 20. The small signals indicating that ZERO's are being read out appear the same as those signals which result from read-out of ONE's, however, since the ZERO read-out signals are much less in amplitude than the ONE read-out signals, they will not overcome the threshold established by the diode 268, the resistor 270 and the base-to-emitter voltage of the transistor in the OR gate 272 (FIG. 12), described previously. The gate 272 will therefore not be actuated in such case, and this will indicate a ZERO read-out.

The output of the OR gate 272 feeds the strobe AND gate 60, so that when a ONE is read out and the strobe signal MS occurs, which is provided by a strobe generator 280, the output of the strobe gate 60 will set the ONE side of a flip-flop 282 in the data register 62 to the ONE state. Each flip-flop 282 constitutes one bit of the memory, so that there are 25 flip-flops 282 in the data register 62.

The flip-flop 282 includes two cross-coupled OR gates 284 and 286, the gate 284 being the ONE side and the gate 286 being the ZERO side. The output 288 of the ZERO side feeds one of the AND gates 64 and one of the data output gates 66. The output 288 divides into two input circuits 200 and 292 which feed the data output gate 66 and which are connected individually to two transistors in parallel, not shown, in the data output gate 66 for the purpose of improving the drive capability. It may be noted at this time that all the gates in the illustrated embodiment of the invention invert their inputs, so that if their input signals are true their output signals will be false, and vice versa.

Accordingly, when a ONE is read out, the output of the OR gate 272 will go true and the output of the strobe gate 60 will go false. This will result in the output of the OR gate 284 going true and the output of the OR gate 286 going false. As indicated earlier, the false level is a positive voltage level and the true level is approximately zero or ground volts. Upon the occurrence of the true digit gate timing signal DG, the digit AND gate 64 will, in this case, not be actuated so that during the write portion of the memory cycle there will be no inhibit current, and a ONE will be written back into the memory. However, if a ZERO is read out, the OR gate 284 will not be set to the ONE state so that the output 288 will remain true, and upon occurrence of the true digit gate timing signal DG, the digit AND gate 64 will provide a positive-going output signal to turn the inhibit driver 18 on. This results in the flow of inhibit current in the particular inhibit line 22. The particular magnetic core 10 will remain in the ZERO state, since the inhibit current effectively cancels one-half of the full select current.

At the conclusion of each memory cycle, the data register clear timing signal DRC occurs and resets all the data register flip-flops 282 to the ZERO state.

Figures 1, 2:
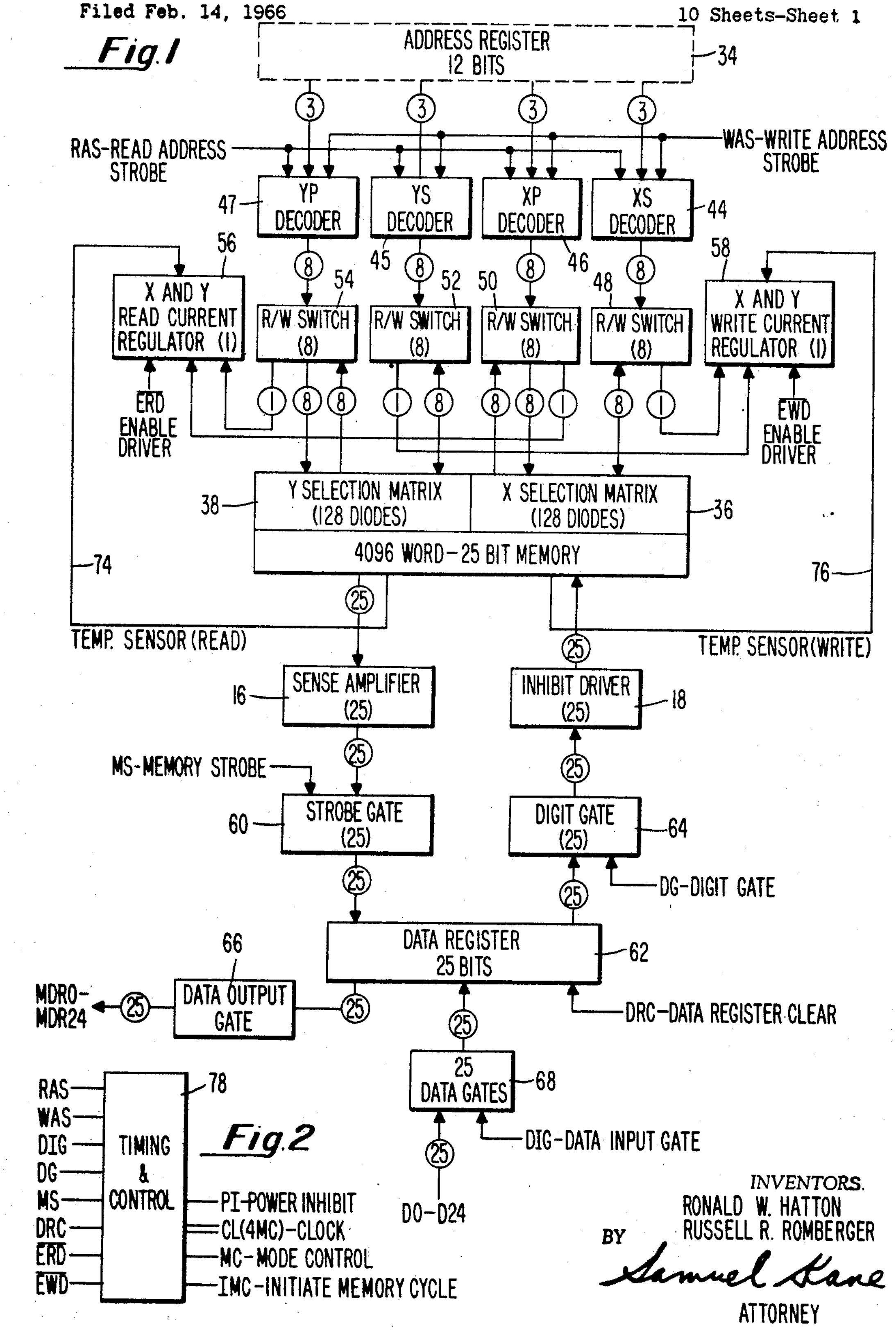
FIG. 2 is a block diagram of a timing and control unit for operation of the memory system.

When operating in the clear-write mode of operation, new data is presented to the data input AND gates 68 through their input circuits D0–D24 (FIG. 1). One of the gates 68 and one of the input circuits D0 is illustrated in FIG. 12. In this mode of operation, the memory strobe signal MS does not occur but instead the data input gate timing signal DIG is applied to the gate 68.

During the write portion of the clear-write operation, the flip-flop 282 will be set to the ONE state by the occurrence of the timing signal DIG if an input signal corresponding to a ONE is presented to the data input gate 68 through the input circuit D0. In this case, when the timing input DG occurs the inhibit driver 18 will not be turned on and full drive current will be applied to switch the selected magnetic core 10 to the ONE state. If the new input data to the gate 68 represents a ZERO, the flip-flop 282 will remain in the ZERO state and the inhibit driver 18 will be energized upon the application of the timing pulse DG. In this case, inhibit current will flow in the inhibit line 22 and the selected magnetic core 10 will therefore remain in the ZERO state.

A schematic diagram of one of the inhibit drivers 18 and its associated inhibit line 22 is shown in FIG. 13. Except for the components that are electrically and magnetically coupled to the collector electrode of a transistor Q17, the rest of the inhibit driver circuit 18 is the same as the core driver circuits CD–1 to CD–4, shown in FIG. 8.

Since the output of the magnetic cores 10 is a function of temperature, some current compensation is necessary in the inhibit drivers to enable them to operate over a relatively wide temperature range. In the present embodiment of the invention, inhibit current is nominally 370 milliamperes at −55° C., 330 milliamperes at +25° C., and 300 milliamperes at +95° C.

Preferably, the inhibit line 22 is wound with copper wire which has a positive temperature coefficient, so that its resistance change with temperature is in the proper direction to increase the inhibit current at low temperatures and to decrease it at high temperatures. If the inhibit line resistance alone were permitted to vary the inhibit current over the temperature range, the current-temperature slope of inhibit current would be just a little less than necessary, for the illustrated embodiment for the invention, for proper current compensation. Correction of the current-temperature slope is accomplished by means of a transformer 294 whose primary winding 296 is connected between the collector electrode of the transistor Q17 and one end of a resistor 298 whose other end is coupled to the positive source of potential 174. The secondary circuit of the transformer 294 includes the secondary winding 300, a diode 302 and the associated inhibit line 22. The turns ratio of the transformer 294 is chosen so that the transferred impedance of the inhibit line 22 is of the proper proportion to adjust the current-temperature slope of inhibit current to the correct value. FIG. 14 illustrates the current-temperature curves, of which the dotted-line curve 304 is the uncompensated curve, and the solid-line curve 306 is the compensated curve.

The above method of compensating the inhibit current eliminates the need for a variable voltage power supply to correct the current-temperature relationship. It also permits current compensation on a bit basis rather than on a memory stack basis. Since heating of the magnetic cores 10 is a function of the number of ZERO's being written into a memory word, the transformer 294 is preferably a step-down transformer so that the load impedance is a greater proportion of the total series impedance, thereby making the inhibit current more load dependent.

The diode 302 is a disconnect diode. Its function is to disconnect the stack load during the time that the transformer 294 is damping. The diode 302 provides a very high damping resistance which permits the transformer 294 to damp rapidly.

When the output circuit 308 (FIG. 12) of the digit gate 64 goes false or positive as the result of a ZERO read-out when operating in the read-restore mode, or as the result of a ZERO input to the data input gate 68 when operating in the clear-write mode, it will turn transistor Q18 on (FIG. 13), and, through the action of a transformer 310, transistor Q17 will also turn on. Collector current will flow in the primary winding 296 and inhibit current will flow in the secondary circuit including the inhibit line 22.

In the illustrated embodiment of the invention, the voltage supply 174 for the inhibit driver 18 was chosen to be +15 volts as an optimum value for minimizing the power drain in this particular embodiment of the memory system. However, the choice of this voltage results in a fairly slow rise time of the inhibit current. The rise time to the 90% point of full inhibit current is typically 0.5 microsecond, in this embodiment.

The inhibit driver 18 is turned on 0.25 microsecond before the X and Y write current regulator 58. The waveform of the current in the X and Y write current regulator 58 rises in 0.2 microsecond. Therefore, inhibit current will reach approximately 90% of its full amplitude by the time the write current has reached 90% of its full amplitude. The inhibit driver 18 remains turned on for 0.25 microsecond after write current is terminated. This is done to insure that full cancellation takes place over the full write current pulse time.

Another advantage of the transformer 294 is that it disconnects the low impedance of the inhibit driver 18 from the memory stack 28. This reduces the effect of capacitive coupling between the drive lines and the inhibit line 22 and between the inhibit line 22 and the sense line 20. The only charging path for stack capacitance is through the inner winding capacitance of the transformer 294 since the secondary winding 300 of this transformer is floating or not connected to any voltage or ground.

A timing diagram for operation of the illustrated embodiment of the invention with a three microsecond cycle time is shown in FIG. 15. The timing diagram is applicable to both the read-restore and clear-write modes of operation. Before the read address strobe signal RAS occurs, the address is stable in the address register 34. This means that all decoded inputs to the core drivers are present and are awaiting the timing signal RAS. The duration of the timing signal waveform RAS, which is further identified as waveform W1 in the timing diagram, is 1.25 microseconds. In connection with time, it is noted at the bottom of the timing diagram that the major divisions are one microsecond, however, the first division is at the 750-nanosecond point from time $t_0$.

The function of the timing signal RAS is to turn on the X and Y read core drivers. The second waveform W2 shows these core drivers turned on. Two hundred and fifty nanoseconds after the core drivers are turned on, the enable read driver signal $\overline{\text{ERD}}$ occurs. This signal waveform W3 enables the X and Y read current regulator 56 and read current flows through the selected X and Y drive lines for a period of 750 nanoseconds. Waveform W4 illustrates the flow of read current.

If a ONE is sensed by the memory there will be a sense amplifier 16 output as shown by waveform W5. The waveform W5 will last for 0.3 microsecond and is dependent upon the strength of the sense signal and the delay within the memory stack 28.

Two hundred and fifty nanoseconds after the $\overline{\text{ERD}}$, a strobe generator trigger signal is generated. This is shown by waveform pulse W6 which is 250 nanoseconds in duration, and its function is to trigger the memory strobe generator 280. After a delay of 0.1 microsecond, the memory strobe generator 280 fires and the resulting signal MS is a 0.1 microsecond pulse, illustrated by waveform W7. The memory strobe signal MS is timed so that it will occur between the earliest sense amplifier output and the latest sense amplifier output, as shown on the timing diagram.

The waveform W8 shows the data register being set by the coincidence of a memory strobe signal MS and a sense amplifier output signal corresponding to a ONE read-out.

The access time is 750 nanoseconds. The access time is defined as the time between the leading edge of waveform W1, and the leading edge of waveform W8.

Immediately after the termination of RAS, the digit gate signal DG and the write address strobe signal WAS occur. This is shown by waveform W9. The function of the write address strobe signal WAS is to enable the write core drivers for writing in the opposite direction through the memory stack. Writing in the opposite direction may be defined as writing a ONE back into the memory. The digit gate pulse DG energizes the inhibit drivers 18 if ZERO's have been read from the memory stack during the read operations. The result of the DG timing pulse is indicated by waveform W10, which is the inhibit current that flows in the memory stack. The result of the WAS pulse is indicated by waveform W11 which shows the X and Y core drivers for write turned on. It should be noted that if a ONE has been read in the previous operation, no inhibit current will flow, even though the timing input DG occurs.

Two hundred and fifty nanoseconds after waveform W9 occurs, waveform W12 occurs. This is the enable write driver waveform, $\overline{\text{EWD}}$ which enables the X and Y write current regulator 58. This timing input $\overline{\text{EWD}}$ occurs for a period of 750 nanoseconds, which is a sufficient period of time to switch a magnetic core 10 back to the ONE state from the ZERO state. The result of the timing pulse $\overline{\text{EWD}}$ is the flow of write current, indicated by waveform W13.

It is to be noted that if a ZERO is to be written into a magnetic core 10, the inhibit current will have occurred 250 nanoseconds before the application of write current to allow sufficient time for the inhibit driver 18 to get the inhibit current up to full amplitude, thereby effectively causing cancellation of one-half of the write current throughout the full time that the write current is applied.

Two hundred and fifty nanoseconds after the timing pulse $\overline{\text{EWD}}$ the timing pulses DG and WAS, indicated by waveform W9, are terminated. This is to insure that the inhibit current lasts throughout the write current time interval so that there is no overlap of the trailing edges of the inhibit current waveform W10 and the write current waveform W13. The X and Y write core drivers are kept turned on for a period of 250 nanoseconds after the termination of write current to allow sufficient time for damping of the selected drive lines and to provide the damping path.

Immediately after the termination of the timing signals DG and WAS, the data register clear signal DRC, indicated by waveform W14 occurs. The data register clear signal DRC clears the data register 62 by resetting the flip-flops 282 to the ZERO state at the end of each read-restore and clear-write cycle, in which state they are held until another memory cycle has started.

The result of the data register clear pulse waveform W14 is shown on waveform W8, which is illustrated as going back to the clear position. The waveform W8 indicates that memory data is available to the associated computer for approximately 1.75 microseconds.

The waveform W15 is the data input gate pulse DIG which is used to set the data register 62 during the clear-write mode of operation. If the DIG pulse waveform W15 occurs, then waveform W6, the strobe generator trigger, will not occur. The opposite situation is also true, that is, if there is a strobe generator trigger, there will be no DIG pulse.

On the base line of the waveform W15 there is a point in time designated MODE STABLE which occurs 500 nanoseconds after time $t_0$. This is the latest point in time at which the associated computer can decide whether it will require a clear-write or a read-restore cycle, since the strobe generator trigger must be applied 500 nanoseconds after time $t_0$. Another critical time, at the beginning of the waveform W15 pulse, is designated INPUT DATA STABLE and indicates that at that time the input data must be stable. In other words, the associated computer must know what information is to be written into the memory at this time.

If a ONE is to be written into the memory upon the occurrence of DIG when operating in the clear-write mode, the date register 62 will be set to the ONE state. This is indicated by waveform W16, which is shown next to waveform W8. If a ZERO is to be written into the memory in this mode of operation, the data register will not be set and there will be no transition in waveform W16. The clearing portion of the clear-write mode is accomplished by energizing the core drivers for read by the timing signal RAS and allowing read current, such as indicated by waveform W4, to flow to the stack. The strobe generator trigger is not enabled in this case, so that the data register 62 will not be set. Thus, the cores 10 that are in the ONE state at the time of read will be switched to the ZERO state, and without any output to the data register. Accordingly, all magnetic cores 10 in a selected word will be in the ZERO state at the time that the data input gate signal DIG occurs.

While there has been disclosed a specific memory system to exemplify the principles of the invention, it is to be understood that this system represents but one embodiment of the invention, and that the invention is capable of being constructed in a variety of circuit configurations and arrangements without departing from its true spirit and scope. Accordingly, it is to be understood that the invention is not to be limited by the specific circuits or components disclosed, but only by the subjoined claims.

What is claimed is:

1. A memory system responsive to coded information received from an address register of an associated computer comprising a matrix of bistable state magnetic storage elements, a plurality of X drive lines each inductively coupled to a row of said storage elements, a plurality of Y drive lines each inductively coupled to a column of said storage elements, each said drive line being adapted to receive read and write currents of such polarity and magnitude that together the magnetic fields of currents in a selected X drive line and a selected Y drive line can cause the storage element common to the selected drive lines to switch from one state of magnetization to a selected state of magnetization, but each magnetic field insufficient in itself to cause such an effect, apparatus for driving read and write currents through a selected one of said X drive lines and a selected one of said Y drive lines, said apparatus comprising a plurality of current generating driving circuits each for driving one of said read or write currents through one of said drive lines, decoding means including a source of timing signals for decoding said address register to select the driving circuits for read and write currents for a selected X drive line and a selected Y drive line, said selected driving circuits being actuated by output signals of said decoding means into a state in which they are substantially saturated, and stabilizing means responsive to certain of said timing signals and cooperating with said driving circuits for sequentially generating and stabilizing read and write currents so that they flow from said substantially saturated driving circuits and through said selected drive lines and said stabilizing means, said stabilizing means including temperature sensing means responsive to changes in temperature in the vicinity of said matrix of storage elements for regulating the quantity of said read and write currents, a sense line inductively coupled to said storage elements and oriented relative thereto for receiving signals of either polarity whenever certain of said storage elements are switched, means for amplifying said signals of either polarity and for providing output signals of at least one polarity, a storage register for storing said one polarity output signals of said amplifying means in coded form, an inhibit line inductively coupled to said storage elements, an inhibit driver responsive to the absence of a coded signal in said storage register for driving inhibit current through said inhibit line to cancel the magnetic field of write current in one of said selected drive lines, means responsive to the presence of a coded signal in said storage register for preventing operation of said inhibit driver, and means for compensating said inhibit current for changes in temperature of said storage elements.

2. A memory system responsive to coded information received from an address register of an associated computer comprising a matrix of bistable state magnetic storage elements, a plurality of X drive lines each inductively coupled to a row of said storage elements, a plurality of Y drive lines each inductively coupled to a column of said storage elements, each said drive line being adapted to receive read and write currents of such polarity and magnitude that together the magnetic fields of currents in a selected X drive line and a selected Y drive line can cause the storage element common to the selected drive lines to switch from one state of magnetization to a selected state of magnetization, but each magnetic field insufficient in itself to cause such an effect, apparatus for driving read and write currents through a selected one of said X drive lines and a selected one of said Y drive lines, said apparatus comprising a plurality of current generating driving circuits each for driving one of said read or write currents through one of said drive lines, decoding means including a source of timing signals for decoding said address register to select the driving circuits for read and write currents for a selected X drive line and a selected Y drive line, said selected driving circuits being actuated by output signals of said decoding means into a state in which they are substantially saturated, and stabilizing means responsive to certain of said timing signals and cooperating with said driving circuits for sequentially generating and stabilizing read and write currents so that they flow from said substantially saturated driving circuits and through said selected drive lines and said stabilizing means, said stabilizing means including temperature sensing means responsive to changes in temperature in the vicinity of said matrix of storage elements elements for receiving signals whenever storage elements are switched, means for amplifying said sense line signals and for providing output signals, a storage register for storing the output signals of said amplifying means in coded form, an inhibit line inductively coupled to said storage elements, an inhibit driver responsive to the absence of a coded signal in said storage register for driving inhibit current through said inhibit line to cancel the magnetic field of write current in one of said selected drive lines, means responsive to the presence of a coded signal in said storage register for preventing operation of said inhibit driver, and means for compensating said inhibit current for changes in temperature of said storage elements.

3. A memory system responsive to coded information received from an address register of an associated computer comprising a matrix of bistable state magnetic storage elements, a plurality of X drive lines each inductively coupled to a row of said storage elements, a plurality of Y drive lines each inductively coupled to a column of said storage elements, each said drive line being adapted to receive read and write currents of such polarity and magnitude that together the magnetic fields of currents in a selected X drive line and a selected Y drive line can cause the storage element common to the selected drive lines to switch from one state of magnetization to a selected state of magnetization, but each magnetic field insufficient in itself to cause such an effect, apparatus for driving read and write currents through a selected one of said X drive lines and a selected one of said Y drive lines, said apparatus comprising a plurality of current generating driving circuits each for driving one of said read or write currents through one of said drive lines, decoding maens including a source of timing signals for decoding said address register to select the driving circuits for read and write currents for a selected X drive line and a selected Y drive line, said selected driving circuits being actuated by output signals of said decoding means into a state in which they are substantially saturated, and stabilizing means responsive to certain of said timing signals and cooperating with said driving circuits for sequentially generating and stabilizing read and write curents so that they flow from said substantially saturated driving circuits and through said selected drive lines and said stabilizing means, said stabilizing means including temperature sensing means responsive to changes in temperature in the vicinity of said matrix of storage elements for regulating the quantity of said read and write currents, a sense line inductively coupled to said storage elements for receiving signals whenever storage elements are switched, means for amplifying said sense line signals and for providing output signals, a storage register for storing the output signals of said amplifying means in coded form, an inhibit line inductively coupled to said storage elements, an inhibit driver responsive to the absence of a coded signal in said storage register for driving inhibit current through said inhibit line to cancel the magnetic field of write current in one of said selected drive lines, and means responsive to the presence of a coded signal in said storage register for preventing operation of said inhibit driver.

4. A memory system responsive to coded information received from an address register of an associated computer comprising a matrix of bistable state magnetic storage elements, a plurality of X drive lines each inductively coupled to a row of said storage elements, a plurality of Y drive lines each inductively coupled to a column of said storage elements, each said drive line being adapted to receive read and write currents of such polarity and magnitude that together the magnetic fields of currents in a selected X drive line and a selected Y drive line can cause the storage element common to the selected drive lines to switch from one state of magnetization to a selected state of magnetization, but each magnetic field insufficient in itself to cause such an effect, apparatus for driving read and write currents through a selected one of said X drive lines and a selected one of said Y drive lines, said apparatus comprising a plurality of current generating driving circuits each for driving one of said read or write currents through one of said drive lines, decoding means including a source of timing signals for decoding said address register to select the driving circuits for read and write currents for a selected X drive line and a selected Y drive line, said selected driving circuits being actuated by output signals of said decoding means into a state in which they are substantially satuated, and stablizing means responsive to certain of said timing signals and cooperating with said driving circuits for sequentially generating and stabilizing read and write currents so that they flow from said substantially saturated driving circuits and through said selected drive lines and said stabilizing means, said stabilizing means including temperature sensing means responsive to changes in temperature in the vicinity of said matrix of storage elements for regulating the quantity of said read and write currents, a sense line inductively coupled to said storage elements for receiving signals whenever storage elements are switched, means for amplifying said sense line signals and for providing output signals, a storage register for storing the output signals of said amplifying means in coded form, an inhibit line inductively coupled to said storage elements, and an inhibit driver responsive to the absence of a coded signal in said storage register for driving inhibit current through said inhibit line to cancel the magnetic field of write current in one of said selected drive lines.

5. A memory system responsive to coded information received from an address register of an associated computer comprising a matrix of bistable state magnetic storage elements, a plurality of X drive lines each inductively coupled to a row of said storage elements, a plurality of Y drive lines each inductively coupled to a column of said storage elements, each said drive line being adapted to receive read and write currents of such polarity and magnitude that together the magnetic fields of currents in a selected X drive line and a selected Y drive line can cause the storage element common to the selected drive lines to switch from one state of magnetization to a selected state of magnetization, apparatus for driving read and write currents through a selected one of said X drive lines and a selected one of said Y drive lines, said apparatus comprising a plurality of current generating driving circuits each for driving one of said read or write currents through one of said drive lines, decoding means including a source of timing signals for decoding said address register to select the driving circuits for read and write currents for a selected X drive line and a selected Y drive line, said selected driving circuits being actuated by output signals of said decoding means into a state in which they are substantially saturated, and stabilizing means responsive to certain of said timing signals and cooperating with said driving circuits for sequentially generating and stablizing read and write currents so that they flow from said substantially saturated driving circuits and through said selected drive lines and said stabilizing means, said stabilizing means including temperature sensing means responsive to changes in temperature in the vicinity of said matrix of storage elements for regulating the quantity of said read and write currents, a sense line inductively coupled to said storage elements for receiving signals whenever storage elements are switched, means for amplifying said sense line signals and for providing output signals, a storage register for storing the output signals of said amplifying means in coded form, an inhibit line inductively coupled to said storage elements, and an inhibit driver responsive to the absence of a coded signal in said storage register for driving inhibit current through said inhibit line to cancel the total magnetic field of write currents in said selected drive lines to such an extent as to prevent the storage element common to the selected drive lines from switching.

6. A memory system responsive to coded information received from an address register of an associated computer comprising a matrix of bistable state magnetic storage elements, a plurality of X drive lines each inductively coupled to a row of said storage elements, a plurality of Y drive lines each inductively coupled to a column of said storage elements, each said drive line being adapted to receive read and write currents of such polarity and magnitude that together the magnetic fields of currents in a selected X drive line and a selected Y drive line can cause the storage element common to the selected drive lines to switch from one state of magnetization to a selected state of magnetization, apparatus for driving read and write currents through a selected one of said X drive lines and a selected one of said Y drive lines, said apparatus comprising a plurality of current generating driving circuits each for driving one of said read or write currents through one of said drive lines, decoding means including a source of timing signals for decoding said address register to select the driving circuits for read and write currents for a selected X drive line and a selected Y drive line, said selected driving circuits being actuated by output signals of said decoding means into a state in which they are substantially saturated, and stabilizing means responsive to certain of said timing signals and cooperating with said driving circuits for sequentially generating and stabilizing read and write currents so that they flow from said substantially saturated driving circuits and through said selected drive lines and said stabilizing means, said stabilizing means including temperature sensing means responsive to changes in temperature in the vicinity of said matrix of storage elements for regulating the quantity of said read and write currents, a sense line inductively coupled to said storage elements for receiving signals whenever storage elements are switched, means for amplifying said sense line signals and for providing output signals, an inhibit line inductively coupled to said storage elements, and means including an inhibit driver responsive to the absence of a said output signal for driving inhibit current through said inhibit line to cancel the total magnetic field of write currents in said selected drive lines to such an extent as to prevent the storage element common to the selected drive lines from switching.

7. A memory system responsive to coded information received from an address register of an associated computer comprising a matrix of bistable state magnetic storage elements, a plurality of X drive lines each inductively coupled to a row of said storage elements, a plurality of Y drive lines each inductively coupled to a column of said storage elements, each said drive line being adapted to receive read and write currents of such polarity and magnitude that together the magnetic fields of currents in a selected X drive line and a selected Y drive line can cause the storage element common to the selected drive lines to switch from one state of magnetization to a selected state of magnetization, apparatus for driving read and write currents through a selected one of said X drive lines and a selected one of said Y drive lines, said apparatus comprising a plurality of current generating driving circuits each for driving one of said read or write currents through one of said drive lines, decoding means including a source of timing signals for decoding said address register to select the driving circuits for read and write currents for a selected X drive line and a selected Y drive line, said selected driving circuits being actuated by output signals of said decoding means into a state in which they are substantially saturated, and stabilizing means responsive to certain of said timing signals and cooperating with said driving circuits for sequentially generating and stabilizing read and write currents so that they flow from said substantially saturated driving circuits and through said selected drive lines and said stabilizing means, said stabilizing means including temperature sensing means responsive to changes in temperature in the vicinity of said matrix of storage elements for regulating the quantity of said read and write currents, a sense line inductively coupled to said storage elements for receiving signals whenever storage elements are switched, an inhibit line inductively coupled to said storage elements, and means including an inhibit driver responsive to the absence of a said sense line signal for driving inhibit current through said inhibit line to cancel the total magnetic field of write currents in said selected drive lines to such an extent as to prevent the storage element common to the selected drive lines from switching.

8. A memory system responsive to coded information received from an address register of an associated computer comprising a matrix of multistable state magnetic storage elements, a plurality of X drive lines each inductively coupled to a row of said storage elements, a plurality of Y drive lines each inductively coupled to a column of said storage elements, each said drive line being adapted to receive current of such polarity and magnitude that together the magnetic fields of both currents in a selected X drive line and a selected Y drive line can cause the storage element common to the selected drive lines to switch from one state of magnetization to another, apparatus for driving said currents through a selected one of said X drive lines and a selected one of said Y drive lines, said apparatus comprising a plurality of current generating driving circuits each for driving current through one of said drive lines, decoding means including a source of timing signals for decoding said address register to select the driving circuits for driving currents through a selected X drive line and a selected Y drive line, said selected driving circuits being actuated by output signals of said decoding means into a state in which they are substantially saturated, and stabilizing means responsive to certain of said timing signals and cooperating with said driving circuits for generating and stabilizing said currents so that they flow from said substantially saturated driving circuits and through said selected drive lines and said stabilizing means, said stabilizing means including temperature sensing means responsive to changes in temperature in the vicinity of said matrix of storage eleemnts for regulating the quantity of said currents, a sense line inductively coupled to said storage elements for receiving signals whenever storage elements are switched, and means for transmitting said sense line signals in coded form to said computer.

9. A memory system responsive to coded information received from an address register of an associated computer comprising a matrix of magnetic storage elements, a plurality of X drive lines each inductively coupled to a row of said storage elements, a plurality of Y drive lines each inductively coupled to a column of said storage elements, each said drive line being adapted to receive current of such polarity and magnitude that together the magnetic fields of both currents in a selected X drive line and a selected Y drive line can cause the storage element common to the selected drive lines to switch from one state of magnetization to another, and apparatus for driving said currents through a selected one of said X drive lines and a selected one of said Y drive lines, said apparatus comprising a plurality of current generating driving circuits each for driving current through one of said drive lines, decoding means including a source of timing signals for decoding said address register to select the driving circuits for driving currents through a selected X drive line and a selected Y drive line, said selected driving circuits being actuated by output signals of said decoding means into a state in which they are substantially saturated, and stabilizing means responsive to certain of said timing signals and cooperating with said driving circuits for generating and stabilizing said currents so that they flow from said substantially saturated driving circuits and through said selected drive lines and said stabilizing means.

10. An address selection matrix for a memory system comprising a plurality of column conductors, a plurality of first row conductors, and a plurality of selection units each coupled to one of said column conductors and one of said first row conductors, each selection unit comprising a drive line connected at one end to said column conductor, a first asymmetrical current conducting device connected between the other end of said drive line and said first row conductor, a second asymmetrical current conducting device connected to said one end of said drive line and in series with said first asymmetrical current conducting device and said drive line, and first switching means coupled to said second asymmetrical current conducting device and said first row conductor for selectively forward biasing said asymmetrical current conducting devices to enable current flow in one direction through said drive line, said drive lines being arranged in groups and said one end of the drive lines of each group being interconnected and connected to the same one of said column conductors and the same one of said second asymmetrical current conducting devices.

11. An address selection matrix according to claim 10 characterized further by the inclusion of a plurality of second row conductors, and wherein each selection unit is coupled to one of said second row conductors and further comprises a third asymmetrical current conducting device connected between said other end of said drive line and said second row conductor, a fourth asymmetrical current conducting device connected to said one end of said drive line and in series with said third asymmetrical current conducting device and said drive line, said third and fourth asymmetrical current conducting devices being poled opposite to that of said first and second asymmetrical current conducting devices, and second switching means coupled to said fourth asymmetrical current conducting device and said second row conductor for selectively forward biasing said third and fourth asymmetrical current conducting devices to enable current flow in the opposite direction through said drive line.

12. An address selection matrix according to claim 11 wherein said asymmetrical current conducting devices are diodes.

13. In an information storage device having a magnetic storage element, a conductor inductively coupled to said storage element, and a driving circuit for driving current through said conductor, said driving circuit comprising a first electronic control device having an emitter electrode, a collector electrode and a control electrode, coupling means coupling one of said emitter and collector electrodes to said conductor, a transformer whose secondary circuit includes said control electrode and one of the other electrodes, energizing means for energizing the primary winding of said transformer, said energizing means comprising a potential source, a second electronic control device having an emitter electrode, a collector electrode and a control electrode, and wherein said primary winding is connected between said potential source and the collector electrode of said second electronic control device, the improvement comprising safety means for automatically turning off said second electronic control device in the event that current in said primary winding exceeds a predetermined magnitude.

14. An improvement according to claim 13 wherein said safety means is a resistor connected between the emitter electrode of said second electronic control device and a point of reference potential.

15. The invention defined in claim 13 wherein said improvement further comprises an improved said coupling means in the form of a second transformer whose secondary circuit contains said conductor and whose primary winding is connected to said one of said emitter and collector electrodes of said first electronic control device, the turns ratio of said second transformer being chosen so that the transferred impedance of said conductor adjusts the current-temperature slope of conductor current to a predetermined value.

16. A current driver for a memory system comprising a drive line, first and second current generating driving circuits, each driving circuit comprising an electronic control device having an emitter electrode, a collector electrode and a control electrode, means coupling the emitter electrode of said first control device to one end of said drive line, means coupling the collector electrode of said second control device to the other end of said drive line, means for first substantially saturating said control devices so that current flows through said control devices but not through said drive line, and means cooperating with said substantially saturated control devices for subsequently driving current through said drive line, and wherein said susbtantially saturating means includes an individual transformer in each of said driving circuits, and the control electrode and one of the other electrodes of each control device are connected in the secondary circuit of the associated transformer.

References Cited

UNITED STATES PATENTS

| | | | |
|---|---|---|---|
| 2,919,434 | 12/1959 | Mestre | 307—88 X |
| 3,001,085 | 9/1961 | Koolhof | 307—88 |
| 3,135,948 | 6/1964 | Ashley | 340—174 |
| 3,164,810 | 1/1965 | Harding | 340—174 |
| 3,175,203 | 3/1965 | Bice | 340—174 |
| 3,231,753 | 1/1966 | Brown | 307—88.5 |
| 3,267,446 | 8/1966 | Woods et al. | 340—174 |
| 3,343,147 | 9/1967 | Ashwell | 340—174 |
| 3,354,443 | 11/1967 | Kuhlmann | 340—174 |
| 3,134,023 | 5/1964 | Russell | 307—88 |
| 3,311,900 | 3/1967 | Gaunt | 340—174 |
| 3,140,400 | 7/1964 | Shansky et al. | 307—88 |

STANLEY M. URYNOWICZ, Jr., Primary Examiner

PO-1050
(5/69)

UNITED STATES PATENT OFFICE

CERTIFICATE OF CORRECTION

Patent No. 3,487,383 Dated Dec. 30, 1969

Inventor(s) Ronald W. Hatton and Russell R. Romberger

It is certified that error appears in the above-identified patent and that said Letters Patent are hereby corrected as shown below:

Column 4, line 39, "end" should read --ends--; column 4, line 53, after "drive" insert --line--. Column 8, line 25, "$\overline{99}$" should read --99--; column 8, line 51, after "of", first occurrence, insert --X--. Column 13, line 39, first occurrence of "the" should read --low--. Column 15, line 58, "110" should read --10--. Column 16, line 51, "200" should read --290--. Column 20, line 17, "date" should read --data--. Column 21, line 51, after "elements" insert --for regulating the quantity of said read and write currents, a sense line inductively coupled to said storage--.

SIGNED AND
SEALED
JUN 16 1970

(SEAL)
Attest:

Edward M. Fletcher, Jr.
Attesting Officer

WILLIAM E. SCHUYLER, JR.
Commissioner of Patents